(12) United States Patent
Tal et al.

(10) Patent No.: US 8,886,904 B2
(45) Date of Patent: Nov. 11, 2014

(54) MANAGING A SOLID-STATE STORAGE DEVICE

(75) Inventors: Doron Tal, Haifa (IL); Shachar Fienblit, Ein Ayala (IL); Yedidia Atzmony, Omer (IL)

(73) Assignee: Kaminario Technologies Ltd., Yokne'Am Ilit (IL)

( * ) Notice: Subject to any disclaimer, the term of this patent is extended or adjusted under 35 U.S.C. 154(b) by 182 days.

(21) Appl. No.: 13/444,251

(22) Filed: Apr. 11, 2012

(65) Prior Publication Data

US 2012/0265926 A1      Oct. 18, 2012

Related U.S. Application Data

(60) Provisional application No. 61/475,344, filed on Apr. 14, 2011.

(51) Int. Cl.
| | |
|---|---|
| *G06F 12/16* | (2006.01) |
| *G06F 12/02* | (2006.01) |
| *G06F 11/10* | (2006.01) |
| *G06F 11/20* | (2006.01) |

(52) U.S. Cl.
CPC .......... *G06F 12/0246* (2013.01); *G06F 11/108* (2013.01); *G06F 11/2094* (2013.01); *G06F 2212/7204* (2013.01); *G06F 2212/7208* (2013.01)
USPC ............ 711/162; 711/103; 711/152; 711/163

(58) Field of Classification Search
CPC . G06F 12/0246; G06F 3/0685; G06F 3/0688; G06F 3/0689
USPC ................... 711/103, 162, 152, 163
See application file for complete search history.

(56) References Cited

U.S. PATENT DOCUMENTS

| | | |
|---|---|---|
| 6,535,949 B1 | 3/2003 | Parker |
| 2009/0031098 A1* | 1/2009 | Sartore .................. 711/162 |
| 2010/0030982 A1* | 2/2010 | Sela et al. .............. 711/162 |
| 2010/0058015 A1* | 3/2010 | Tokoro .................. 711/162 |
| 2010/0122019 A1 | 5/2010 | Flynn et al. |
| 2010/0180069 A1 | 7/2010 | Yeh |
| 2010/0262765 A1 | 10/2010 | Cheon et al. |
| 2012/0151254 A1* | 6/2012 | Horn .................... 714/6.22 |
| 2013/0191578 A1* | 7/2013 | Goss et al. ............. 711/102 |

* cited by examiner

*Primary Examiner* — John Lane
(74) *Attorney, Agent, or Firm* — Wiggin and Dana LLP; Gregory S. Rosenblatt

(57) ABSTRACT

A method, comprising: during a normal operating mode of a first solid-state storage device, reserving a portion of an available physical storage space of the first solid-state storage device, giving rise to a reserved portion and a user data portion; setting a user data capacity of the first solid-state storage device according to a size of the user data portion; using substantially the entire available physical storage space for storing user data within the first solid-state storage device; and upon receiving at the first solid-state storage device an instruction to switch to a data protection mode, switching the first solid-state storage device to the data protection mode and allocating part of the reserved portion to the user data portion, giving rise to an extended user data portion, and using the added user data capacity for backing up data that is or was stored on the second solid-state storage device.

48 Claims, 4 Drawing Sheets

# MANAGING A SOLID-STATE STORAGE DEVICE

FIELD OF THE INVENTION

The present invention is in the field of solid-state storage devices management and control.

BACKGROUND OF THE INVENTION

US Pre-Grant Patent Publication No. 2010/0262765 to Wonmoon et al. discloses a storage apparatus that includes a memory unit and a controller adapted to set up a memory space of the memory unit as a user data space and a spare space according to a signal representing at least one of the user data space and spare space. Further disclosed are an electronic apparatus that controls the storage apparatus, and a method that controls at least one of the storage apparatus and the electronic apparatus to control a memory space of the storage apparatus.

US Pre-Grant Patent Publication No. 2010/0180069 Chih-Kang discloses a block management method for a flash memory of a storage system, wherein the flash memory includes a plurality of physical blocks. The block management method includes grouping the physical blocks into a plurality of physical units, and grouping the physical units into a data area, a spare area, and a replacement area. The block management method further includes performing a first physical unit switch which switches the physical units between the data area and the spare area, and performing a second physical unit switch which switches the physical units between the spare area and the replacement area. Therefore, the block management method can uniformly use the physical blocks and thereby effectively prolong a lifespan of the storage system.

U.S. Pat. No. 6,535,949 to parker discloses a portable electronic device that includes a log-structured file system implemented in flash memory. The log-structured file system includes a write function for storing contiguous data records to the flash memory in the form of at least one data log, although the system may write data records to the flash memory using a plurality of data logs. The log-structured file system also includes a read function for retrieving data records from the one or more logs using a plurality of memory mapped pointers, which may be stored in an associated index. A clean-log function is also provided for eliminating inactive records from the log so that new data can be appended to the end of the log. The various functions associated with the log-structured file system are implemented as at least three software modules, a read module, a write module and a clean-log module, although other configurations are possible.

US Pre-Grant Patent Publication No. 2010/0122019 to Flynn et al. discloses an apparatus, system, and method for managing physical regions in a solid-state storage device. The definition module defines a physical storage region on solid-state storage media of a solid-state storage device. The physical storage region includes a subset of total physical storage capacity on the solid-state storage media. The storage controller performs memory operations within the physical storage region such that the memory operations are bounded to the physical storage region. The implementation module implements the physical storage region definition with respect to the storage controller for the solid-state storage media.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave or act according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component can be embodied in operational data or operation data can be used by a presently disclosed component. By way of example, such operational data can be stored on intangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

There is provided according to an aspect of the disclosed subject matter a method of managing a solid-state storage device, comprising, during a normal operating mode of a first solid-state storage device, reserving a portion of an available physical storage space of the first solid-state storage device, giving rise to a reserved portion and a user data portion; setting a user data capacity of the first solid-state storage device according to a size of the user data portion; using substantially the entire available physical storage space for storing user data within the first solid-state storage device; and upon receiving at the first solid-state storage device an instruction to switch to a data protection mode, switching the first solid-state storage device to the data protection mode and allocating at least part of the reserved portion to the user data portion, giving rise to an extended user data portion having added user data capacity, and using the added user data capacity for backing up data that is or was stored on the second solid-state storage device.

There is further provided according to an embodiment of the disclosed subject matter a method, wherein during the normal operation mode of the first solid-state storage device, the extent of user data that can be stored in the first solid-state storage device storage unit is based substantially on a size of the respective user data portion.

There is yet further provided according to an embodiment of the disclosed subject matter a method, further comprising, during a normal operation mode, defining a logical storage space of the first solid-state storage device substantially according to a size of the respective user data portion.

There is yet further provided according to an embodiment of the disclosed subject matter a method, further comprising, during the normal operation mode, using substantially the entire available physical storage space for servicing I/Os related to the logical storage space of the first solid-state storage device.

There is yet further provided according to an embodiment of the disclosed subject matter a method, further comprising, upon switching to the data protection mode, adding to the logical storage space of the first solid-state storage device, logical blocks corresponding to the data that was stored on the second solid-state storage device and was backed up on the first solid-state storage device.

There is yet further provided according to an embodiment of the disclosed subject matter a method, wherein upon switching to the data protection mode, copying data from the second solid-state storage device to the first solid-state storage device and using the added user data capacity for backing up the data that was copied from the second solid-state storage device.

There is yet further provided according to an embodiment of the disclosed subject matter a method, wherein the data on the second solid-state storage device is protected by redundant data on one or more other solid-state storage devices, and upon receiving an indication that the second solid-state storage device is failing and switching the first solid-state storage device to the data protection mode, copying at least part of the backup data corresponding to data on the second solid-state storage device from the one or more other solid-state storage devices to the first solid-state storage device and using the added user data capacity on the first solid-state storage device for storing the backup that corresponds to the data that was stored on the second solid-state storage device.

There is yet further provided according to an embodiment of the disclosed subject matter a method, wherein the one or more other solid-state storage devices that backup the data on the second solid-state storage device are part of a RAID group or part of a mirror pair with the second solid-state storage device.

There is yet further provided according to an embodiment of the disclosed subject matter a method, wherein upon receiving an indication that the second solid-state storage device is restored or is replaced and after the data associated with the logical blocks that correspond to the data that was stored the second solid-state storage device and was backed up on the first solid-state storage device is written on the second solid-state storage device or on a replacement solid-state storage device, reconfiguring the available physical storage space of the first solid-state storage device to extend the reserved portion at the expense of the size of the user data portion.

There is yet further provided according to an embodiment of the disclosed subject matter a method, wherein reconfiguring includes erasing the physical storage resources on the first solid-state storage device that were allocated to logical blocks that correspond to the data that was stored on the second solid-state storage device.

There is yet further provided according to an embodiment of the disclosed subject matter a method, wherein erasing includes applying a TRIM command to the physical storage resources on the first solid-state storage device that were allocated to logical blocks that correspond to the data that was stored on the second solid-state storage device.

There is yet further provided according to an embodiment of the disclosed subject matter a method, further comprising implementing a log structured file system over substantially the entire available physical storage space.

There is yet further provided according to an embodiment of the disclosed subject matter a method, wherein the first solid-state storage device is a NAND flash device.

There is yet further provided according to an aspect of the disclosed subject matter a method of managing a solid-state storage device, comprising, during a normal operating mode of a first solid-state storage device, reserving a portion of an available physical storage space of the first solid-state storage device, giving rise to a reserved portion and a user data portion; setting a user data capacity of the first solid-state storage device according to a size of the user data portion; using the entire available physical storage space for storing user data within the first solid-state storage device; and upon receiving an indication that a second solid-state storage device is failing, switching the first solid-state storage device to a data protection mode and backing up at least part of the data that is or was stored on the second solid-state storage device on storage resources of the first solid-state storage device that are associated with the reserved portion, and mapping logical blocks that were associated with the data that was stored on the second solid-state storage device and was copied to the first solid-state storage device to the storage resources on the first solid-state storage device that are used for storing the backup data.

There is yet further provided according to an embodiment of the disclosed subject matter a method, wherein during the normal operation mode of the first solid-state storage device, the extent of user data that can be stored in the first solid-state storage device storage unit is based on the size of the respective user data portion.

There is yet further provided according to an embodiment of the disclosed subject matter a method, further comprising, during a normal operation mode, defining a logical storage space of the first solid-state storage device unit according to the size of the respective user data portion.

There is yet further further provided according to an embodiment of the disclosed subject matter a method, further comprising, during the normal operation mode, using the entire available physical storage space for servicing I/Os related to the logical storage space of the first solid-state storage device.

There is yet further further provided according to an embodiment of the disclosed subject matter a method, further comprising, upon switching to the data protection mode, adding to the logical storage space of the first solid-state storage device logical blocks that correspond to the data that was stored on the second solid-state storage device and that is being backed up on the first solid-state storage device.

There is yet further further provided according to an embodiment of the disclosed subject matter a method, wherein upon switching to the data protection mode, copying data from the second solid-state storage device to the first solid-state storage device and adding to the logical storage space of the first solid-state storage device logical blocks that correspond to the data that was stored on the second solid-state storage device and is being backed up on the first solid-state storage device.

There is yet further provided according to an embodiment of the disclosed subject matter a method, wherein at least part of the data on the second solid-state storage device is protected by redundant data on one or more other solid-state storage devices, and upon receiving an indication that the second solid-state storage device is failing and switching the first solid-state storage device to the data protection mode, writing on the first solid-state storage device backup data which corresponds to at least part of the reserved portion on the one or more other solid-state storage devices, and adding to the logical storage space of the first solid-state storage device logical blocks that correspond to the data that was stored on the second solid-state storage device and is being backed up on the first solid-state storage device.

There is yet further provided according to an embodiment of the disclosed subject matter a method, wherein the one or more other solid-state storage devices that protect at least part of the data on the second solid-state storage device are part of a RAID group or part of mirror pair with the second solid-state storage device.

There is yet further provided according to an embodiment of the disclosed subject matter a method, wherein upon receiving an indication that the second solid-state storage device is restored or is replaced and after the data associated with the logical blocks that correspond to the data that was stored on the second solid-state storage device and was backed up on the first solid-state storage device is written on the second solid-state storage device or on a replacement solid-state storage device, switching the first solid-state storage device to the normal operating mode, including reverting the logical storage space of the first solid-state storage device to its configuration during the normal operating mode.

There is yet further provided according to an embodiment of the disclosed subject matter a method, wherein switching the first solid-state storage device to the normal operating mode includes erasing the reserved portion of the available physical storage space of the first solid-state storage device and using the entire available physical storage space of the first solid-state storage device for servicing I/Os related to the logical storage space of the first solid-state storage device.

There is yet further provided according to an embodiment of the disclosed subject matter a method, wherein erasing includes applying a TRIM command to the physical storage resources on the first solid-state storage device that are associated with the reserved portion.

There is yet further provided according to an aspect of the disclosed subject matter a solid-state storage device, comprising a solid-state storage device controller adapted to control the operation of a first solid-state storage device; a solid-state storage device management module adapted to over-provision a physical storage space of the first solid-state storage device, giving rise to an over-provisioned space and an available physical storage space; a storage space configurator operable for causing the solid-state storage device controller to reserve a portion of the available physical storage space of the first solid-state storage device during a normal operating mode of the first solid-state storage device, giving rise to a reserved portion and a user data portion; the storage space configurator is further adapted for causing the solid-state storage device controller to set a user data capacity of the first solid-state storage device during the normal operating mode according to a size of the user data portion; further during the normal operating mode, the storage controller is adapted to use substantially the entire available physical storage space for storing user data on the first solid-state storage device; the controller is responsive to receiving an indication that a second solid-state storage device is failing or has failed for switching the first solid-state storage device to a data protection mode and for allocating at least part of the reserved portion to the user data portion, giving rise to an extended user data portion having added user data capacity, and using the added user data capacity for backing up data that is or was stored on the second solid-state storage device.

There is yet further provided according to an embodiment of the disclosed subject matter, a solid-state storage device, wherein during the normal operation mode of the first solid-state storage device, the extent of user data that can be stored in the first solid-state storage device is based substantially on the size of the respective user data portion.

There is yet further provided according to an embodiment of the disclosed subject matter a solid-state storage device, wherein during the normal operation mode, a logical storage space of the first solid-state storage device unit is defined substantially according to a size of the respective user data portion.

There is yet further provided according to an embodiment of the disclosed subject matter a solid-state storage device, wherein during the normal operation mode, the solid-state storage device controller is configured to use substantially the entire available physical storage space for servicing I/Os related to the logical storage space of the first solid-state storage device.

There is yet further provided according to an embodiment of the disclosed subject matter a solid-state storage device, further comprising, upon switching to the data protection mode, the storage space configurator is adapted to cause the solid-state storage device controller to add to the logical storage space of the first solid-state storage device logical blocks corresponding to the data that was stored on the second solid-state storage device and was backed up on the first solid-state storage device.

There is yet further provided according to an embodiment of the disclosed subject matter a solid-state storage device, wherein upon switching to the data protection mode, the solid-state storage device controller is adapted to copy data from the second solid-state storage device to the first solid-state storage device and to use the added user data capacity for backing up the data that was copied from the second solid-state storage device.

There is yet further provided according to an embodiment of the disclosed subject matter a solid-state storage device, wherein the data on the second solid-state storage device is protected by redundant data on one or more other solid-state storage devices, and wherein upon receiving an indication that the second solid-state storage device is failing and switching the first solid-state storage device to the data protection mode, the solid-state storage device controller is adapted to copy at least part of the backup data corresponding to data on the second solid-state storage device from the one or more other solid-state storage devices to the first solid-state storage device, and to use the extended user data capacity on the first solid-state storage device to store the backup data that corresponds to the data that was stored on the second solid-state storage device.

There is yet further provided according to an embodiment of the disclosed subject matter a solid-state storage device, wherein upon receiving an indication that the second solid-state storage device is restored or is replaced, the solid-state storage device controller is configured to cause the data associated with the logical blocks that correspond to the data from the second solid-state storage device that was backed up on the first solid-state storage device to be written on the second solid-state storage device or on a replacement solid-state storage device, and the storage space configurator is adapted to reconfigure the available physical storage space of the first solid-state storage device to extend the reserved portion at the expense of the size of the user data portion.

There is yet further provided according to an embodiment of the disclosed subject matter a solid-state storage device, wherein the storage controller is adapted to erase the physical storage resources on the first solid-state storage device that were allocated to logical blocks that correspond to the data that was stored on the second solid-state storage device.

There is yet further provided according to an embodiment of the disclosed subject matter a solid-state storage device, wherein the storage controller is adapted to apply a TRIM command to the physical storage resources on the first solid-state storage device that were allocated to logical blocks that correspond to the data that was stored on the second solid-state storage device.

There is yet further provided according to an embodiment of the disclosed subject matter a solid-state storage device, wherein the storage controller is adapted to implement a log structured file system over substantially the entire available physical storage space.

There is yet further provided according to an aspect of the disclosed subject matter, a solid-state storage device, comprising a solid-state storage device controller adapted to control the operation of a first solid-state storage device; a solid-state storage device management module adapted to over-provision a physical storage space of the first solid-state storage device, giving rise to an over-provisioned space and an available physical storage space; a storage space configurator operable for causing the solid-state storage device controller to reserve a portion of the available physical storage space of the first solid-state storage device during a normal operating mode of the first solid-state storage device, giving rise to a reserved portion and a user data portion; the storage space configurator is further adapted for causing the solid-state storage device controller to set a user data capacity of the first solid-state storage device during the normal operating mode according to a size of the user data portion; further during the normal operating mode, the storage controller is adapted to use substantially the entire available physical storage space for storing user data within the first solid-state storage device; the controller is responsive to receiving an indication that a second solid-state storage device is failing for switching the first solid-state storage device to a data protection mode, and for backing up at least part of the data that was stored on the second solid-state storage device on storage resources of the first solid-state storage device that are associated with the reserved portion, and for mapping logical blocks that were associated with the data that was stored on the second solid-state storage device and was copied to the first solid-state storage device to the storage resources on the first solid-state storage device that are used for storing the backup data.

There is yet further provided according to an embodiment of the disclosed subject matter, a solid-state storage device, wherein during the normal operation mode of the first solid-state storage device, the extent of user data that can be stored in the first solid-state storage device is based substantially on the size of the respective user data portion.

There is yet further provided according to an embodiment of the disclosed subject matter, a solid-state storage device, wherein during the normal operation mode, a logical storage space of the first solid-state storage device is defined substantially according to a size of the respective user data portion.

There is yet further provided according to an embodiment of the disclosed subject matter, a solid-state storage device, wherein during the normal operation mode, the solid-state storage device controller is configured to use substantially the entire available physical storage space for servicing I/Os related to the logical storage space of the first solid-state storage device.

There is yet further provided according to an embodiment of the disclosed subject matter, a solid-state storage device, further comprising, upon switching to the data protection mode, the storage space configurator is adapted to cause the solid-state storage device controller to add to the logical storage space of the first solid-state storage device logical blocks that correspond to the data that was stored on the second solid-state storage device and that is being backed up on the first solid-state storage device.

There is yet further provided according to an embodiment of the disclosed subject matter, a solid-state storage device, wherein upon switching to the data protection mode, the solid-state storage device controller is adapted to copy data from the second solid-state storage device to the first solid-state storage device and to add to the logical storage space of the first solid-state storage device logical blocks that correspond to the data that was stored on the second solid-state storage device and is being backed up on the first solid-state storage device.

There is yet further provided according to an embodiment of the disclosed subject matter, a solid-state storage device, wherein the data on the second solid-state storage device is protected by redundant data on one or more other solid-state storage devices, and wherein upon receiving an indication that the second solid-state storage device is failing and switching the first solid-state storage device to the data protection mode, the solid-state storage device controller is adapted to write on the first solid-state storage device backup data which corresponds to at least part of the redundant data on the one or more other solid-state storage devices, and to add to the logical storage space of the first solid-state storage device logical blocks that correspond to the data that was stored on the second solid-state storage device and is being backed up on the first solid-state storage device.

There is yet further provided according to an embodiment of the disclosed subject matter, a solid-state storage device, wherein upon receiving an indication that the second solid-state storage device is restored or is replaced, the solid-state storage device controller is configured to cause the data associated with the logical blocks that correspond to the data that was stored on the second solid-state storage device and was backed up on the first solid-state storage device to be written on the second solid-state storage device or on a replacement solid-state storage device, and the storage space configurator is adapted to switch the first solid-state storage device to the normal operating mode, including reverting the logical storage space of the first solid-state storage device to its configuration during the normal operating mode.

There is yet further provided according to an embodiment of the disclosed subject matter, a solid-state storage device, wherein the storage controller is adapted to erase the physical storage resources on the first solid-state storage device that were allocated to logical blocks that correspond to the data from the second solid-state storage device.

There is yet further provided according to an embodiment of the disclosed subject matter, a solid-state storage device, wherein the storage controller is adapted to apply a TRIM command to the physical storage resources on the first solid-state storage device that were allocated to logical blocks that correspond to the data that was stored on the second solid-state storage device.

There is yet further provided according to an embodiment of the disclosed subject matter, a solid-state storage device, wherein the storage controller is adapted to implement a log structured file system over substantially the entire available physical storage space.

There is yet further provided according to an embodiment of the disclosed subject matter, a method, wherein the second solid-state storage device and one or more other solid-state storage devices constituted a RAID group, and wherein following the copying of data corresponding to data on the second solid-state storage device to the first solid-state storage device; and adding the storage resources on the first solid-state storage device that are used for storing the data corresponding to data that was stored on the second solid-state storage device to the RAID group.

There is yet further provided according to an embodiment of the disclosed subject matter, a method, wherein upon receiving an indication that the second solid-state storage device is failing switching a first plurality of solid-state storage devices to the data protection mode, copying at least part of the backup data corresponding to data that was stored on the second solid-state storage device to each one of the solid-state storage devices from the first plurality of solid-state storage devices; and adding the storage resources on each one of the solid-state storage devices from the first plurality of solid-state storage devices that are used for storing the data corresponding to data that was stored on the second solid-state storage device to the RAID group instead of the second solid-state storage device.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
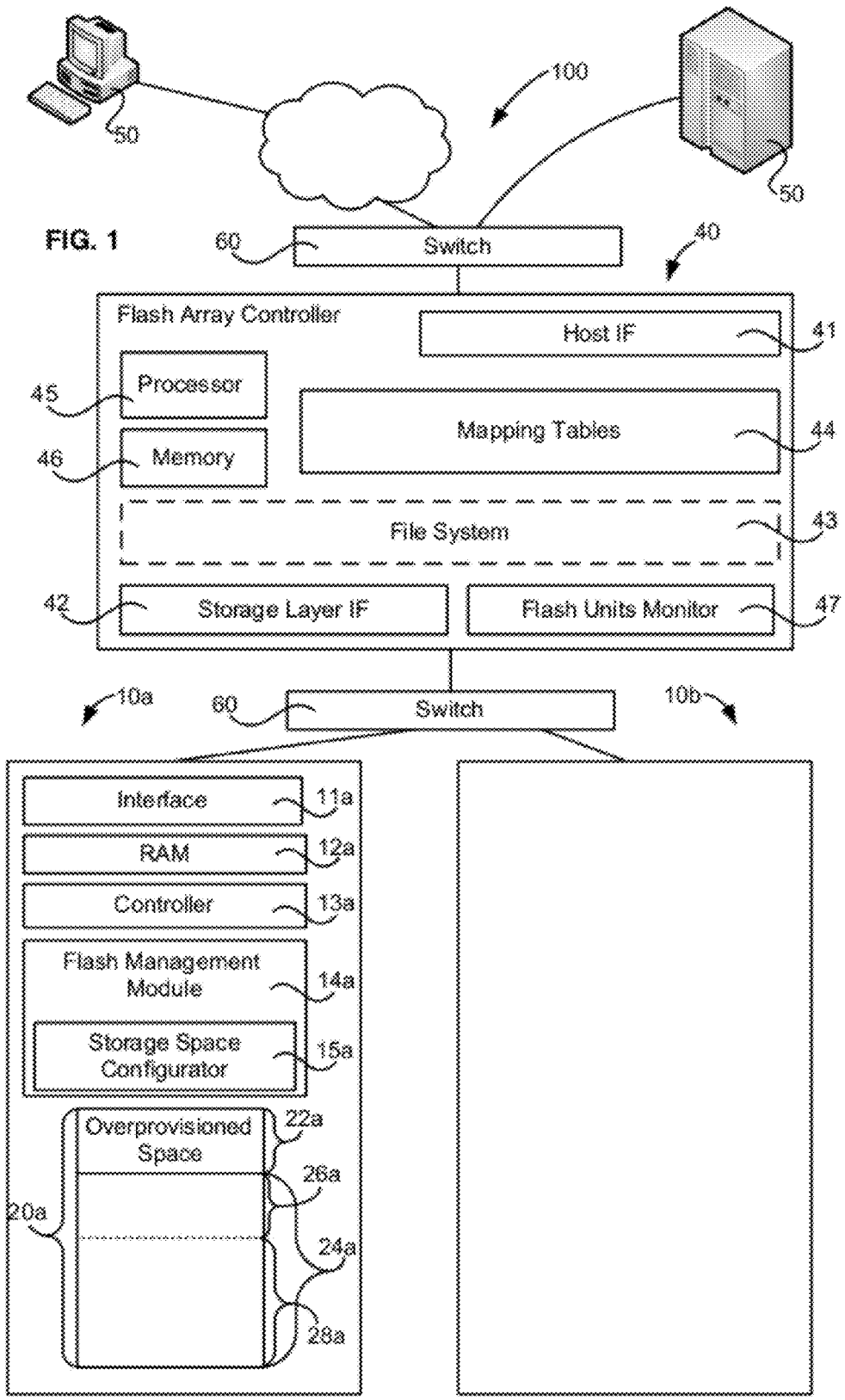
FIG. 1 is a block diagram illustration of a storage system including solid-state storage devices according to an example of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such tangible information storage, transmission or display devices.

Various examples of the presently disclosed subject matter relate to or imply a flash storage unit. Other examples relate to or imply a solid-state storage device. In examples of the presently disclosed subject matter the term "flash" is sometimes used interchangeably with the term solid-state storage device and vice-versa. It would be appreciated by those versed in the art that certain embodiments of the present invention are applicable to any solid-state storage device that is operable according to the presently disclosed subject matter, and are not necessarily limited to any one particular type of solid-state storage device. Other non-limiting examples of a solid-state storage device can include non-volatile storage devices, such as NAND based flash memory, and volatile storage devices, such as RAM or DRAM storage devices.

Some examples of the presently disclosed subject matter relate to or imply a single-level-cell (abbreviated "SLC") solid-state storage device or flash storage device. However, it would be appreciated that embodiments of the present invention can be readily used by those versed in the art with other types of semiconductor storage devices, including multi-level-cell (sometimes abbreviated "MLC") solid-state storage devices, enterprise multi-level-cell solid-state storage devices (sometimes abbreviated "eMLC") or flash storage devices.

The physical storage space of a flash storage device is usually divided into a plurality of memory cells. Each bit in a memory cell of a flash can only be programmed from "1" to "0". Accordingly, an erasing operation has to be performed before programming (or writing) data to a memory address which contains old data (also commonly referred to as "invalid data"). A typical flash storage device is organized in blocks, with multiple pages per block. Data is written to a flash in physical units called pages, each page including multiple memory cells. However, flash storage devices can only be erased in blocks.

Because flash blocks must be erased before they can be reused for new data, and because an erase operation is substantially more expensive in flash compared to a write operation, it is typical that when new data comes in replacing older data already written, the flash controller will write the new data in a new location and update the logical mapping to point to the new physical location. The old location is no longer holding valid data. Typically, data which is not valid is marked as "invalid" (e.g., by the flash controller) and the locations where invalid data is stored are also marked by the flash controller. Eventually, the locations where invalid data is stored shall be erased before it can be written again.

In order to achieve a more consistent level of performance, in particular in storage systems that involve significant write activity, manufactures over-provision flash storage devices. By a-priori setting aside a portion of the physical storage resources of the flash, manufacturers reduce the likelihood that a write operation would need to wait for storage resource to be erased before the data can be written to the erased space. Thus for example, a drive with 64 GB of advertised capacity may have 80 GB of flash inside. The over provisioning configuration can be, but is not necessarily, hard-coded into the flash's firmware and would thus require special programming in order to change the configuration of the physical storage space. Modification of the over provisioning configuration can be otherwise restricted. Some manufacturers allow users to determine and set the amount of over-provisioning to suit their needs, and in flash devices modifying the over provisioning of the flash can be a relatively straightforward process.

Some examples of the presently disclosed subject matter relate to a method and a system for managing a solid-state storage device. According to an example the presently disclosed method, during a normal operation state of a first solid-state storage device, a portion of an available physical storage space of the first solid-state storage device is reserved, giving rise to a reserved portion and a user data portion. A user data capacity of the first solid-state storage device is set according to a size of the user data portion, whereas substantially the entire available physical storage space is used for storing user data within the first solid-state storage device.

Upon receiving an indication that a second solid-state storage device is failing, the first solid-state storage device is switched to a data protection mode, and in response to switching to the data protection mode, at least part of the reserved portion of the first solid-state storage device is allocated to the user data portion, giving rise to an extended user data portion, and data that is or was the second solid-state storage device is backed up on the first solid-state storage device using the added user data capacity of the extended user data portion.

Reference is now made to FIG. 1, which is a block diagram illustration of a storage system including solid-state storage devices according to an example of the presently disclosed subject matter. According to an example, a storage system 100 can include two or more solid-state storage devices. The two or more solid-state storage devices can be part of a group of solid-state storage devices, as explained below. For convenience and by way of non-limiting example, in FIG. 1, there are shown two flash storage devices 10a and 10b, although the storage system 100 can include any number of solid-state storage devices from two and above, and can also include non-solid-state storage devices, such as hard disk drives for example, which are not shown here.

According to an example of the presently disclosed subject matter, the storage system 100 shown in FIG. 1 is used for storing hosts' 50 data and for allowing the hosts 50 to read and write data to and from the storage system 100. Being part of the storage system 100, the two flash storage devices 10a and 10b can be adapted for storing user data and for servicing I/Os relating to the data stored thereon.

The storage system 100 can also include a storage system controller 40. By way of example, the storage system controller 40 controls certain aspects of the operation of various components, storage devices or units of the storage system 100, including certain aspects of the operation of the flash storage devices 10a and 10b. In some examples of the presently disclosed subject matter, the storage system controller 40 operates independently to control the operation of certain ones of the various components, storage devices or units of the storage system 100, and in other examples, the storage system controller 40 operates in cooperation with the various components, storage devices or units of the storage system 100 to control the operation thereof. The operation of storage system 100 can be controlled according to predefined (e.g. pre-programmed) routines and/or according to manual instructions received from an administrator of the storage system 100. For example, some of the operating routines can reside within and can be executed by the storage system controller 40. Similarly, by way of example, manual operation commands can be received at and can be implemented by the storage system controller 40. The storage system controller 40 can include a processor 45 and memory 46 which, for example, are adapted to operate in conjunction with any of the other components of the storage system controller 40 to perform or facilitate a presently disclosed operation thereof.

By way of example, the storage system controller 40 can be adapted to control the interaction between the hosts 50 and the storage devices of the storage system 100, including the two flash storage devices 10a and 10b. As an example, switches 60 or any other interconnection components can be used to allow connection of many hosts to many storage devices, and the storage system controller 40 can be implemented as an intermediate control and management layer. The storage system controller 40 can include a host interface 41 and a storage layer interface 42 to facilitate communication with the hosts 50 and with the storage devices, respectively.

The storage system controller 40 can also be adapted to control and manage various aspects of the operation of the components of the storage system 100. Thus for example, the storage devices within the storage system 100 can allocate storage resources for storing user data therewithin, and the storage system controller 40 can register the storage resources externalized by each one of the storage devices. The storage system controller 40 can implement a file system 43 and/or use allocation tables 44 to control the writing of data to the underlying storage devices and the exchange of I/O traffic in-between the hosts 50 and the storage devices, and in between the storage device themselves. In accordance with an example of the presently disclosed subject matter, the storage system controller 40 can implement a block device file system over the plurality of storage devices that are associated with the storage system controller 40. Accordingly, and still by way of example, the storage system controller 40 can provision logical blocks to the hosts 50. The mapping of the logical blocks to physical storage resources within the storage devices with which the storage system controller is 40 associated is discussed below.

It would be appreciated that while the storage system controller 40 is shown here as a dedicated central component that is operatively connected to each of the storage devices in the storage system 100 and to the hosts 50, the storage array controller 40 can be a distributed component and can be implemented as part of the storage devices themselves, in a manner known per-se.

It would be appreciated by those of ordinary skill in the art, that various implementations of a storage system control layer are known in the art and can be readily used with examples of the presently disclosed subject matter, possibly in conjunction with further or less components and/or operations, as necessary in accordance with examples of the presently disclosed subject matter.

According to an example of the presently disclosed subject matter, the first flash device 10a can include an interface 11a, a flash device controller 13a, a flash management module 14a, a storage space configurator 15a and one or more arrays of memory cells which are collectively referred to herein as the physical storage space 20a of the (first) flash 10a. By way of example, the interface 11a can be operable for connecting the flash device 10a with the storage system controller 40. Further by way of example, the interface 11a can be operable for connecting the flash device 10a with the other storage devices of the storage system 100 and/or with the hosts 50 themselves directly, for instance in case the controller 40 is integrated into the storage devices.

By way of example, data can be written into or read from the first flash 10a through the processing of the flash device controller 13a. The flash device controller 13a can also be used for erasing memory cells and for performing various device management operations according to instructions from a device management program. By way of example, processing instructions and processing data can be memorized by the memory 12a for use by the flash device controller 13a. It would be appreciated that memory 12a can be implemented using any commercially available or yet to be devised computer memory technology, including, but not limited to RAM, DRAM, SRAM.

The flash management module 14a includes configuration definitions of the flash device 10a, including for example configuration definitions of the physical storage space 20a of the flash device 10a and of the memory cells. The flash management module 14a can be used to initiate and configure memory management operations within the first flash device 10a. By way of example, the flash management module 14a can execute wear leveling procedures, manage bad blocks, etc. The flash management module 14a can be electronically connected to the flash controller 13a and the two components can operate cooperatively to execute the procedures and routines and to use the configurations provided by the flash management module 14a.

According to an example of the presently disclosed subject matter, the flash management module 14a is adapted to over-provision the physical storage space 20a of the first flash 10a, giving rise to an over-provisioned space 22a and an available physical storage space 24a. Over provisioning of a solid-state storage device is a process that is known per-se and is in use by various flash manufacturers. The over provisioned space 22a is used in by the flash management module 14a to improve the performance of the flash 10a in various ways and under various operating conditions, on the expense of the user data storage capacity of the flash 10a. For example, the flash management module 14a can use the over-provisioned space to create pre-erased blocks which can be made ready for use in the flash's virtual pool. In another example, by creating the over-provisioned space the reliability and/or the lifespan of the flash storage device can be extended by using blocks from the over-provisioned space to replace bad blocks from the available physical storage space. The flash management module 14a can be configured to use the over-provisioned space in any other way that is currently used by commercially available solid-state storage devices or that would be otherwise known to those versed in the art.

According to one example of the presently disclosed subject matter, the over provisioning configuration within the flash management module 14a can be set by the manufacturer in a manner which restricts modification thereof, so that an administrator of the storage system 100 can not readily modify the over provisioning configuration. For example, the over provisioning configuration can be set in firmware or in hardware. However, in other examples of the presently disclosed subject matter, the over provisioning configurations are implemented in a way which enables straightforward modifications by an administrator.

According to an example of the presently disclosed subject matter, the first flash device 10a can also include a storage space configurator 15a. The storage space configurator 15a can be adapted to reserve a portion of the available physical storage space 24a of the flash 10a, giving rise to a reserved portion 26a and a user data portion 28a. It should be noted that the reserved portion is a portion of the available physical storage space 24a, which is selected to be reserved, and is not part of the over provisioned space 22a. The reserved portion is also a portion of the available physical storage space of the flash that can be used in case one of the other members of a solid-state storage devices group has failed to allow the other members of the group to allocate additional storage capacity for user data and to use the added user data storage capacity for backing up the data that is or was stored on the failed solid-state storage device, as will be described in further detail below.

In one example, only the user data portion 28a is formatted and externalized or allocated, and the reserved portion 26a is not formatted and is thus not available externally and can only be used internally by the flash management module 14a. In another example, the entire available physical storage space 24a of the flash 10a is formatted, but during the normal operation mode of the flash 10a only the user data portion 28a is externalized or allocated, and the reserved portion 26a is not, so that in effect the reserved portion 26a is hidden from the user/hosts.

According to an example of the presently disclosed subject matter, the storage space configurator 15a can be implemented as part of the flash management module 14a. In another example, the storage space configurator 15a can be implemented as a separate component within the flash 10a and can operate independently or in cooperation with the flash management module 14a and/or the storage space configurator can operate independently or in cooperation with the flash controller 13a. In yet another example, the storage space configurator 15a can be implemented externally to the flash 10a, for example, as part of the storage system controller 40, as will be further described below. In this example, the storage space configurator 15a and the flash management module 14a may or may not be configured to communicate and to operate cooperatively.

It would be appreciated that some existing solid-state storage device management modules, or solid-state storage device controllers including flash management modules or flash controllers (collectively referred to now as "flash management module" or in plural "flash management modules"), are configured to monitor usage patterns of the physical storage space of the solid-state storage device and can identify that a portion of the solid-state storage device is substantially persistently not being used for storing user data, i.e., that only a portion of the available physical storage space of the solid-state storage device is being used for storing user data, and can use that "unused" portion of the solid-state storage device to configure certain solid-state storage device management processes to use at least part of the portion of the available physical storage space that is identified as persistently not being used for storing user data. According to an example, the solid-state storage device management module can use the part of the portion of the available physical storage space that is identified as persistently not being used for storing user data to improve certain aspects of the operation of the solid-state storage device, e.g., the performance of the solid-state storage device in random writes. It would be appreciated, that some existing solid-state storage device management modules can be configured to utilize a portion of the available physical storage space that is identified as persistently not being used for storing user data in a similar manner as the over-provisioning space. The solid-state storage device management module according to example of the presently disclosed subject matter can be configured in accordance with any such presently known or commercially available solid-state storage device management modules that are capable of configuring certain solid-state storage device management processes to use at least part of a portion of the solid-state storage device that is identified as persistently not being used for storing user data. In some solid-state storage devices, the solid-state storage device management module can be configured to use an identified portion of the solid-state storage device that is substantially persistently not being used as an extension of the over-provisioned space, at least in some respects.

In case the storage space configurator 15a is configured to communicate with the flash management module 14a and update it with regard to the division of the physical storage space 24a and with regard to the size of reserved portion 26a and/or with regard to the size of the user data portion 28a, the flash management module 14a can be configured to relate to the reserved portion as an identified portion of the available physical storage space of the flash that is persistently not being used for storing user data, and the flash management module 14a can apply its predefined configuration and/or routines with respect of such portion of the available physical storage space of the flash that is persistently not being used for storing user data, for example, to improve performance of certain operations of the flash 10a.

In the example where the storage space configurator 15a is implemented as part of the storage system controller 40, the division of the available physical storage space 24a of the flash 10a can take place outside the flash device 10a, at the storage system controller 40. In such a case, the division of the available physical storage space of the flash 10a is applied externally to the flash 10a. In one example, the division of the available physical storage space can be transparent to the flash 10a and in particular to the flash management module 14a. In this case, the storage system controller 40 can be configured to allocate only part of the available physical storage space 24a of the flash 10a to the hosts 50 which corresponds to the user data portion of the available physical storage space of the flash 10a, and thus at least a portion of the available physical storage space 24a of the flash 10a is not allocated to the hosts 50 and is not available for storing user data. It would be appreciated that in this example, as well as in other examples provided herein, the reserved portion of the available physical storage space of the flash 10a is allocated in addition to the over-provisioning space on the flash device 10a. Further by way of example, the reserved portion of the available physical storage space of the flash 10a is allocated in addition to the over-provisioning space on the flash device 10a. As mentioned above, the flash management module 14a can be configured to independently identify that a portion of the available physical storage space of the flash device 10a is substantially persistently not being used for storing user data, i.e., that only a portion of the available physical storage space 24a of the flash 10a is being used for storing user data, and can configure certain flash management processes to use at least part of the portion of the available physical storage space that is identified as persistently not being used for storing user data.

It would be appreciated that in case the storage space configurator is implemented as a central component within the storage system 100, for example, as part of the storage system controller 40, the storage space configurator can be adapted to control the division of the available storage of multiple solid-state storage devices and can be configured to apply an identical or different division with respect to each one of the solid-state storage devices associated therewith.

Still further by way of example, the flash management module 14a can be configured to operate in a similar manner, i.e., to independently identify that a portion of the available physical storage space of the flash device 10a is substantially persistently not being used, and can configure certain flash management processes to use at least part of the portion of the available physical storage space that is identified as persistently not being used for storing user data.

According to an example of the currently disclosed subject matter, since during the normal operation mode of the flash 10a only the user data portion 28a of the available physical storage space of the flash is allocated for storing user data within the first flash 10a, the flash management module 14a can use the reserved portion 26a of the available physical storage space of the flash to improve the performance of the flash 10a under various operating conditions, on the expense of the storage capacity of the flash 10a. For example, the flash management module 14a can use the storage resources which constitute the reserved portion of the available physical storage space to create pre-erased blocks which can be made ready for use in the flash's virtual pool, and/or in another example, to replace bad blocks, etc. It would be appreciated that pre-erased blocks can contribute to the flash's write and overall performance. Replacing bad blocks can extend the service life of the flash.

As already mentioned, some existing solid-state storage device management modules are configured to monitor usage patterns of the available physical storage space of a solid-state storage device and can identify that a portion of the available physical storage space is substantially persistently not being used. In some examples of the present disclosure, any such known or presently used solid-state storage device management module configuration, which is capable of receiving as input data with regard to a portion of the available physical storage space of a solid-state storage device that is substantially persistently not being used, can be configured for storing user data, whether such data is discovered by the solid-state storage device management module as a result of monitoring the usage patterns of the available physical storage space of the solid-state storage device, or whether the data is provided as input, e.g. from an administrator or a storage system controller, and is capable of using such input to improve the performance of the flash 10a under various operating conditions can be implemented in the flash management module 14a according to examples of the presently disclosed subject matter.

In one example, the information with regard to the configuration of the available physical storage space 24a, and in particular details with regard to the reserved portion 26a and the user data portion 28a is made available to the storage system controller 40. In another example, during the normal operation mode of the flash 10a, the storage system controller 40 is not made aware of the reserved portion 26a, and the flash 10a only exposes to the storage system controller 40 storage resources in an extent which is substantially equivalent to the size of the user data portion 28a. In either case, during a normal operation mode of the first flash 10a, the storage system controller 40 can be configured to allocate to the hosts 50 storage resource in an extent that is based on only the user data portion 28a of the flash 10a.

By way of example, the system controller 40 can be configured to provide an abstraction of the storage resources of the storage system 100, and can be configured to allocate to the hosts 50 associated with the storage system 100 a pool of storage resources that are collectively provided by a plurality of underlying storage devices (in FIG. 1 two devices are shown as an example), the storage system controller 40 can be configured to determine the contribution of the first flash 10a to the storage pool based on the size of the user data portion 28a, and the reserved portion (which is also part of the first flash available physical storage space 24a) is not taken into account for this purpose. Further by way of example, the storage system controller 40 can be configured to limit the extent of user data that is addressed to the first flash 10a according to the size of the user data portion 28a. According to an example of the presently disclosed subject matter, during a normal operation mode the first flash 10a the storage system controller 40 can be configured to associate logical blocks with the first flash 10a and the number (or size) of the logical blocks associated with the first flash 10a is determine according to the size of the respective user data portion 28a of the available physical storage space of the first flash 10a, and the reserved portion is not taking into in this regard.

According to an example of the presently disclosed subject matter, the reserved portion 26a and the user data portion 28a are not tied to specific physical resources of the flash 10a, but rather represent a total amount of physical resources that are associated with each respective portion. A given page or a given block of the flash 10a can be part of the reserved portion 26a at one instant and can become part of the user data portion 28a at a later instant, and vice versa. Accordingly, the storage space configurator 15a defines the reserved portion 26a and the user data portion 28a in terms of respective portions out of the entire available physical storage space 24a, or as respective portions out of the entire physical storage space 20a. More details with regard to the management of the available physical storage space 24a are provided below.

Figure 2:
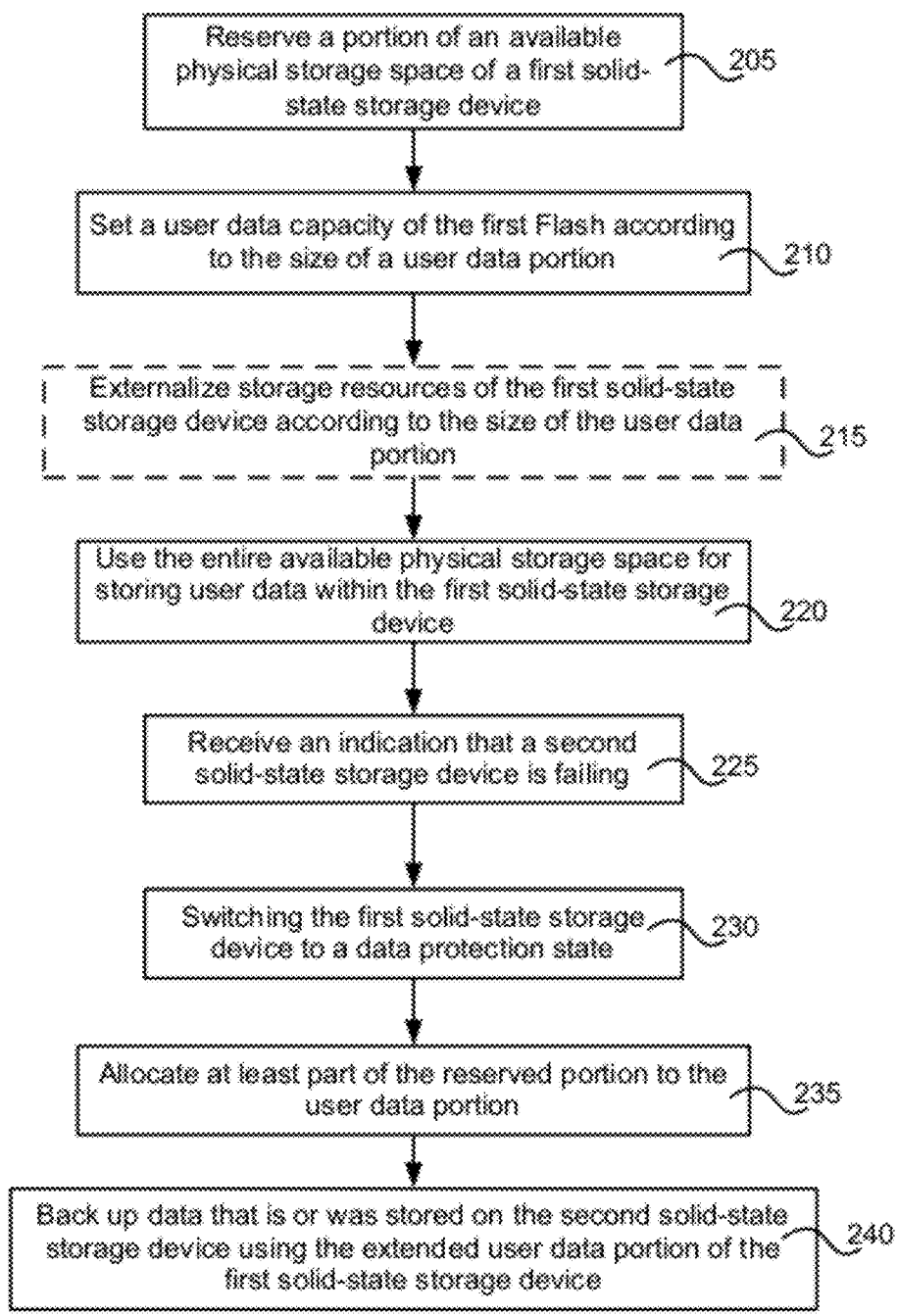
FIG. 2 is a flow chart illustration of a method of managing a storage system including solid-state storage devices according to an example of the presently disclosed subject matter.

Reference is now additionally made to FIG. 2 which is a flow chart illustration of a method of managing a storage system including solid-state storage devices according to an example of the presently disclosed subject matter. According to the example illustrated in FIG. 2 a portion of an available physical storage space 24a of a first solid-state storage device 10a is reserved (block 205), giving rise to a reserved portion 26a and to a user data portion 28a. As mentioned above, in an example of the presently disclosed subject matter, the available physical storage space 20a of the solid-state storage device 10a can result from an over provisioning process or operation, which divides the physical storage resources 20a of the solid-state storage device 10a to an over-provisioned space 22a and to an available physical storage space 24a. It would be appreciated that according to further examples of the presently disclosed subject matter, the solid state storage device (e.g., device 10a) is not necessarily over provisioned. Further by way of example, the available physical storage space 24a can be substantially equal to the entire physical storage space 20a. Unless specifically stated otherwise, the examples of the presently disclosed subject matter also apply to solid state storage devices, and to flash devices in particular, in which over provisioning was not implemented, where no over-provisioned space was created (or allocated), or where the available physical storage space is substantially equal to the entire physical storage space.

During a normal operation mode of the solid-state storage device 10a, a user data capacity of the first solid-state storage device 10a can be set according to a size of the user data portion 28a (block 210), as was described above. According to an example of the disclosed subject matter, during the normal operation mode, the first solid-state storage device 10a can be configured to externalize storage resources in an extent that is based on the size of the user data portion 28a only, rather than based on the entire available physical storage space 24a (block 215). Thus, whilst the first solid-state storage device 10a is in a normal operation mode, its storage capacity would appear to be less than the actual capacity of the entire available physical storage space 24a. Further by way of example, the storage system controller 40 can be configured to allocate to the hosts 50 storage resource on the first solid-state storage device 10a according to the storage capacity of the storage resources exposed by the first solid-state storage device 10a.

As mentioned above, in other examples of the presently disclosed subject matter, the first solid-state storage device 10a can be configured to externalize storage resources in an extent that is based on the entire available physical storage space 24a, and during a normal operation mode of the first solid-state storage device 10a the storage system controller 40 can be configured to allocate to the hosts 50 storage resources within the first solid-state storage device 10a in an extent that is based on the size of the user data portion 28a only, rather than based on the entire available physical storage space 24a.

For instance, according to a non-limiting example, an over-provisioning configuration can be applied to the solid-state storage device 10a, so that the solid-state storage device's 10a total physical storage space capacity is set at 40 GB. The physical storage space capacity of the solid-state storage device can be over provisioned, and an over-provisioned space that is 8 GB in size can be created. The available physical storage space of the solid-state storage device 10a is thus 32 GB. Out of the 32 GB which constitute the available physical storage space, the storage space configurator 15a reserves an 8 GB portion as the reserved portion, and the user data portion is thus set to be 24 GB, which corresponds to the remainder of the available physical storage space. Further according to this example, during a normal operation mode of the solid-state storage device, the solid-state storage device would appear to have a capacity of 24 GB, although its actual physical storage space is 40 GB, and its available physical storage space is 32 GB. It would be appreciated, that other ratios, sizes, quantities, etc. can be used according to examples of the presently disclosed subject matter.

According to examples of the presently disclosed subject matter, the solid-state storage device management module 14a of the first solid-state storage device 10a can be configured to use the entire available physical storage space for storing user data within the first solid-state storage device (block 220), and for servicing I/O commands with respect to the user data stored thereon. As was explained above, since the extent of user data that is stored within the first solid-state storage device during the normal operating mode is limited according to the size of the user data portion of the available physical storage space of the first solid-state storage device, at any given instant during the normal operating mode of the first solid-state storage device, there are available physical storage resources that are not used for storing valid data, and the solid-state storage device management module can use such "unused" physical storage resources to improve the performance of the first solid-state storage device.

As mentioned above, the solid-state storage device management module 14a can be configured to monitor usage patterns of the physical storage space of the solid-state storage device and can identify that a portion of the solid-state storage devices substantially persistently not being used, i.e., that only a portion of the available physical storage space of the solid-state storage device is being used for storing user data, and can configure certain solid-state storage device management processes to use at least part of the portion of the available physical storage space that is identified as persistently not being used for storing user data. In another example, the solid-state storage device management module 14a receives the information with regard to the reserved portion 26a that is not allocated for storing user data and relates to the reported reserved portion 26a of the available physical storage space 24a as a portion of the available physical storage space of the solid-state storage device that is not allocated for storing user data, or as a portion of the available physical storage space 24a that is persistently not used for storing user data.

As was also mentioned above, according to an example, the solid-state storage device management module 14a can be configured to use at least part, and possibly all of the portion of the available physical storage space that is identified as persistently not being used for storing user data, to improve certain aspects of the operation of the solid-state storage device 10a, e.g., the performance of the solid-state storage device 10a in random writes. Further by way of non-limiting example, the solid-state storage device management module 14a can be configured to use the reserved portion 26a of the solid-state storage device 10a to create pre-erased blocks which can be made ready for use in the solid-state storage device's 10a virtual pool. Further by way of example, the solid-state storage device management module 14a can be configured to use the reserved portion 26a of the solid-state storage device 10a in any other way that is currently used by commercially available solid-state storage devices or that would be otherwise known to those versed in the art.

As mentioned above, the storage system includes two or more solid-state storage devices. According to an example of the presently disclosed subject matter, at some point, an instruction to switch to the data-protection mode can be received at the first solid-state device 10a. According to examples of the presently disclosed subject matter, the instruction to switch the first solid-state storage device 10a can be associated with a condition of, or with a performance issue related to, another storage device, e.g., the second solid-state storage device 10b. Further by way of example, the indication with regard to the second solid-state storage device 10b can be otherwise invoked and can be unrelated to the condition of, or to a performance issue relating to, the second solid-state storage device 10b. For example, the indication with regard to the second solid-state storage device 10b can be provided upon request from an operator of the system 100.

For convenience, in the following examples of the presently disclosed subject matter, the instruction that can be provided to the first solid state storage device 10a, and which is effective for causing the first solid state storage device 10a to switch to the data-protection, is described by way of non-limiting example as an indication that is related to a failure (or an impending failure) of the second solid-state storage device 10b. It would be appreciated, that according to further examples of the presently disclosed subject matter, the indication that the second solid-state storage device 10b is failing or has failed, which causes the first solid-state device 10a to switch to the data-protection mode, can be substituted with an instruction to the first solid-state device 10a to switch to the data-protection mode, and the instruction can be either related to the condition or to a performance issue associated with the second solid-state storage device 10b, or not.

Continuing now with the description of some examples of the presently disclosed subject matter, an indication with regard to the failure of the second solid-state storage device 10b can be a result of any predefined event or lack of response that is defined as being indicative of a failure or of an approaching failure of the second solid-state storage device 10b. In another example, the indication with regard to the failure of the second solid-state storage device 10b can be a result of a test that is applied to the second solid-state storage device 10b or to some function or component of the second solid-state storage device 10b, e.g., when according to the results of the tests the solid-state storage device 10b failed or is approaching a failed state. According to non-limiting examples, the indication with regard to the second solid-state storage device 10b can be associated with one or more of the following: a failure to respond to an IO (or a certain number of IOs) by the second solid-state storage device 10b; an error report from or with respect to the second solid-state storage device 10b; or a report of a high endurance number from or with respect to the second solid-state storage device 10b.

Further by way of example, the indication with regard to the second solid-state storage device 10b can be otherwise invoked and can be not necessarily associated with any failure or with any performance issue related to the second solid-state storage device 10b. For example, the indication with regard to the second solid-state storage device 10b can be provided upon request from an operator of the system 100.

According to some examples of the presently disclosed subject matter, the second solid-state storage device 10b itself can be configured to detect the failure or approaching failure and can be configured to report the failure or approaching failure to its peers, including to the first solid-state storage device 10a and/or to the storage system controller 40. In another example, the storage system controller 40, includes a solid-state storage devices monitor 47 and is adapted to routinely monitor the operation of the solid-state storage devices. The solid-state storage devices monitor 47 can be configured to detect a failure of a solid-state storage device or an approaching failure of a solid-state storage device and can be configured to notify one or more members of the same group of solid-state storage devices that a certain solid-state storage device that is a member of this group of solid-state storage devices has failed (or is about to fail). The first solid-state storage device 10a can be configured to receive an indication with regard to the failure or approaching failure of the second solid-state storage device 10b (block 225), e.g., directly from the failed or failing solid-state storage device 10b or through a notification from the storage system controller 40.

According to another example of the presently disclosed subject matter, the solid-state storage devices monitor 47 can be configured to notify a solid-state storage device which is not a member of the group of solid-state storage devices but is designated for protecting the data that is or was stored on one of the members of the group of solid-state storage devices that failed or is failing. The protecting solid-state storage device can be designated in advance or can be selected, for example, when the failure is detected. Thus for example, the second solid-state storage device 10b can be a member of a RAID group, and the first solid-state storage device 10a, which is not a member of the same RAID group as the second solid-state storage device 10b, can be designated or selected for protecting the data that is or was stored on the second solid-state storage device 10b in case the second solid-state storage device 10b has failed or is failing. In case the protecting solid-state storage device is not a member of the same RAID group as the failed or failing solid-state storage device that it is designated to protect, after backing up the data that was stored on the failed or failing solid-state storage device, the backup solid-state storage device can join the RAID group instead of the failed solid-state storage device. It would be appreciated that in case a plurality of solid-state storage devices are used for backing up the failed solid-state storage device, the portion of each one of the solid-state storage devices that is used for storing data that was stored on the failed solid-state storage device can become, together with the other portions of the other backup solid-state storage devices, part of the RAID group.

Figure 3:
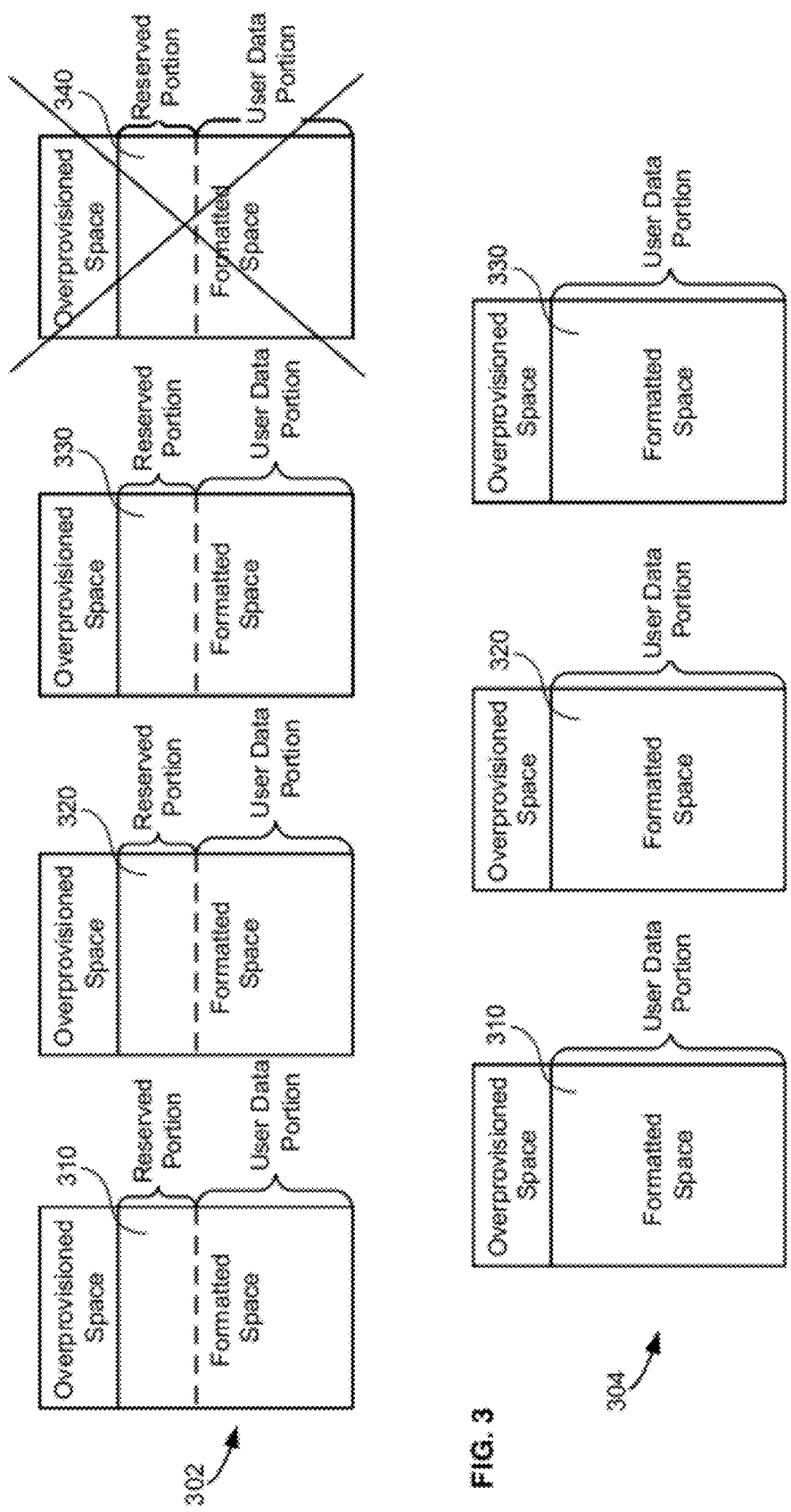
FIG. 3 is a graphical illustration of a group consisting of a plurality of solid-state storage devices according to an example of the presently disclosed subject matter.

Reference is now additionally made to FIG. 3, which is a graphical illustration of a group consisting of a plurality of solid-state storage devices according to an example of the presently disclosed subject matter. In FIG. 3, there is shown a group of solid-state storage devices, which at a first instant 302 consists of solid-state storage devices 310, 320, 330 and 340. According to an example, each of the solid-state storage devices 310, 320, 330 and 340 includes an over-provisioned space, and an available physical storage space.

In FIG. 3 the state of the group of solid-state storage devices is shown at a first instant 302, when all the solid-state storage devices 310, 320, 330 and 340 are in a normal operating mode. During the normal operating mode, the available physical storage space of each of the solid-state storage devices 310, 320, 330 and 340 is comprised of a user data portion and a reserved portion. Further by way of example, during the normal operation mode, the reserved portion of each of the solid-state storage devices 310, 320, 330 and 340 is one third of the user data space, i.e. 25% of the available physical storage space is defined as a reserved portion and 75% of the available physical storage space is defined as a user data portion.

At some point during the operation of the storage system, a failure can be detected with respect to one of the solid-state storage devices in the group, in this example the indication is received with regard to the solid-state storage device marked 340. In response to detecting the failure of the solid-state storage device marked 340, each of the other solid-state storage devices 310, 320, 330 in the group (or only some of which) can receive an indication that the solid-state storage device marked 340 has failed, and each of the other solid-state storage devices 310, 320, 330 in the group (or only some of which) can be configured to switch to a data protection mode in response to the failure notification. It would be appreciated that the indication with regard to the solid-state storage device marked 340 can be received at the storage system controller, and the storage system controller can instructed each of the solid-state storage devices 310, 320, 330 in the group (or only some of which) to switch to a data protection mode. The switch to the data protection mode in response to an indication of a failure of a peer solid-state storage device is also depicted in block 230 of FIG. 2, where the first solid-state storage device 10a switches to a data protection mode in response to identifying that the second solid-state storage device 10b is failing or has failed.

In response to the switch to the data protection mode, the first solid-state storage device 10a can be configured to reconfigure its available physical storage space 24a and allocate at least part of its reserved portion 26a for storing user data, and thereby increase its respective user data portion 28a (block 235) giving rise to an extended user data portion. In FIG. 3, the reconfiguration of the available physical storage space is shown at instant 304, where each of the solid-state storage devices 310, 320 and 330 in the same group with the failed solid-state storage device 340 switch to the data protection mode and as a result reconfigure their respective available physical storage spaces and allocate their respective reserved portion to the user data portion thereby increasing their respective capacity for storing user data. In this example, as a result of switching to the data protection mode, the entire available physical storage space of each of the solid-state storage devices 310, 320, 330 is made available for storing user data.

Referring to FIG. 2, according to examples of the presently disclosed subject matter, following the reconfiguration of the available physical storage space 24a of the first solid-state storage device 10a, the data that is or was stored on the second solid-state storage device 10b can be backed up on the first solid-state storage device 10a using the extended user data portion of the first solid-state storage device 10a (block 240). According to examples of the presently disclosed subject matter, the extended user data portion of the first solid-state storage device 10a can be used to back up a certain portion of the logical storage space that was associated with the failed second solid-state storage device 10b, for example until the second solid-state storage device 10b is repaired or until a replacement storage module is provided in place of the second solid-state storage device 10b. Further by way of example, the portion of the logical storage space that was associated with the failed second solid-state storage device 10b and is now backed up by the first solid-state storage device 10a can be mapped to the first solid-state storage device 10a while it is used to back up the failed second solid-state storage device 10b. Thus, the first solid-state storage device 10a can service, for example, write, read and erase commands which relate to data that is associated with the portion of the logical storage space that was associated with the second solid-state storage device 10b and is now backed up and mapped to the first solid-state storage device 10a. It would be appreciated, that the data in the first solid-state storage device 10a, that is associated with the portion of the logical storage space that was associated with the second solid-state storage device 10b, can be protected by at least one copy or some other backup data (e.g., parity group and parity data) that is stored on one or more other storage devices.

Referring to FIG. 3, It would be appreciated that during the normal operation mode of each of the solid-state storage devices 310, 320, 330 and 340, each of the solid-state storage devices is used to store data in an extent which is based on the size of the respective user data portion of the respective available physical storage space, rather than based on the entire available physical storage space of the solid-state storage device. Upon switching to the data protection mode, the user data portion of each of the solid-state storage devices 310, 320, and 330 that are used to back up the data that is or was stored on the failed solid-state storage device 340 is extended and the user data capacity of the solid-state storage devices 310, 320, and 330 is increased. The added capacity of each one of the solid-state storage devices 310, 320, and 330 that switched to the data protection mode can be used to store user data that is or that was stored on the failed solid-state storage device 340, as well as new data which is associated with the portion of the logical storage space that is backed up by the reconfigured solid-state storage devices 310, 320, and 330.

According to a further example of the presently disclosed subject matter, as was mentioned above, the solid-state storage device that is used to backup the data that is or was stored on a failing or on a failed solid-state storage device can be a solid-state storage device which is not a member of the same group of solid-state storage devices as the failing solid-state storage device. The solid-state storage device that is used for backing up the failing or failed solid-state storage device can be pre-designated or can be selected at any stage of the process, for example, when the failure is detected. As is shown in FIG. 3 the data that is or was stored on a failed or failing solid-state storage device can be backed up on a plurality of solid-state storage devices, and still by way of example, each one of the plurality of solid-state storage devices that are used to backup the data on the failed (or failing) solid-state storage device can be a solid-state storage device which is not a member of the same group of solid-state storage devices (e.g., a RAID group) which the failed (or failing) solid-state storage device is/was a member of.

Further by way of example, upon switching to the data protection mode, each solid-state storage device (one or a plurality) that is designated or selected for backing up the failed or failing solid-state storage device can be adapted to reconfigure its available physical storage space and allocate at least part of its reserved portion for storing user data. The user data that is to be stored on the newly allocated physical storage resources can be the data which corresponds to the data that is or was stored on the failed or failing solid-state storage device. Still further by way of example, the failed or failing solid-state storage device may be a member of a RAID group that stores redundant backup data that can be used to recover the data on the failed solid-state storage device. Thus, by way of example, the solid-state storage device or solid-state storage devices that is/are designated or selected for protecting the failed (or failing) solid-state storage device can obtain the data that is necessary to backup the data that is or was stored on the failed or failing solid-state storage device from the failing solid-state storage device if the data is still available, or if the data is no longer available on the failed solid-state storage device, the data that was stored on the failed solid-state storage device can be recovered from the redundant data on the other members of the solid-state storage devices (RAID) group (which the failed solid-state storage device was a member of), and the recovered data can be stored on the solid-state storage device or solid-state storage devices that is/are designated or selected for protecting the failed (or failing) solid-state storage device. The data can be stored on the solid-state storage device or solid-state storage devices that is/are designated or selected for protecting the failed (or failing) solid-state storage device until the failed solid-state storage device is repaired or until a replacement solid-state storage device is provided.

In some examples of the presently disclosed subject matter, the RAID group can be utilized to continue and protect the data that was stored on the failed solid-state storage device, and that is now stored on one or more other solid-state storage devices which were not members of the RAID group and are used for backing up the failed solid-state storage device. In this regard, it would be appreciated that the definition of the RAID group can be updated to allow the continued implementation of the RAID protection while the data that was stored on the failed disk is stored on the backup solid-state storage device(s). By way of example, the storage resources that are used for storing the data which corresponds to the data that was stored on the failed solid-state storage device can be added to the RAID group until the failed solid-state storage device is repaired or replaced. As was mentioned above, according to examples of the presently disclosed subject matter, the backup solid-state storage device(s) can be used to backup a certain portion of the logical storage space that was associated with the failed solid-state storage device, for example, until the failed solid-state storage device is repaired or until a replacement storage module is provided in place of the failed solid-state storage device. The portion of the logical storage space that was associated with the failed solid-state storage device and is now backed up by the reconfigured backup solid-state storage device(s) can be mapped to the reconfigured backup solid-state storage device(s) while it is (or they are) used to backup the failed solid-state storage device. Thus, the backup solid-state storage device(s) can service, for example, write, read and erase commands which relate to data that is associated with the portion of the logical storage space that was associated with the failed solid-state storage device and is now backed up by the reconfigured backup solid-state storage devices.

By way of example, a backup solid-state storage device can be any solid-state storage device that is selected for being switched to a data protection mode for storing therein data from another solid-state storage device, and any solid-state storage device that was switched to the data protection mode and that is or is intended to be used for storing therein data from another solid-state storage device, according to examples of the presently disclosed subject matter.

It would be appreciated, that in a system according to examples of the presently disclosed subject matter, where the failed solid-state storage device is a member of a RAID group (or some other group that enables recovery of the data on the failed solid-state storage device) and the reconfigured backup solid-state storage device(s) is/are not one of the members of the same RAID group with the failed disk, the chance of a single point of failure can be reduced. In other words, if the failed solid-state storage device and the backup solid-state storage device(s) are members of the same RAID group, can compromise the RAID protection, for example, if the data on the backup solid-state storage device(s) is lost.

It would be appreciated that RAID scheme groups are used here as an example only and other groups in other configurations which can be used to protect the data on the solid-state storage device in case it fails can be likewise used in accordance with examples of the presently disclosed subject matter.

It would be also appreciated that the extension of the user data portion of each of the solid-state storage devices 310, 320, and 330 during the data protection mode on the expense of the reserved portion can have an impact over the performance of each of the solid-state storage devices 310, 320, and 330. However, as will be described below, once the failed solid-state storage device 340 is repaired or replaced, the configuration of each of the solid-state storage devices 310, 320, and 330 may be resorted to its state during the normal operation mode. In a further example, the configuration of the physical storage space, and specifically the division of the physical storage space, is restored but is modified as necessary in case the relevant characteristics of the replacing solid-state storage device are different from those of the failed solid-state storage device, for example, in case the size of the user data portion of the replacing solid-state storage device is larger compared to the failed solid-state storage device. The following discussion relates to further characteristics of a solid-state storage device or of a group of solid-state storage devices which can have an effect on the configuration of the physical storage space, and specifically the division of the physical storage space according to examples of the presently disclosed subject matter.

According to another example of the presently disclosed subject matter, upon switching to the data protection mode the backup solid-state storage device can be configured to maintain the division of its respective available physical storage spaces as it was during the normal operating mode, and the respective reserved portion can be allocated for backing up data that is or was stored on the failed solid-state storage device, which the backup solid-state storage device is designated or selected to protect. In this example, the user data capacity is also increased and the added user data capacity is used for backing up data that is or was stored on the failed solid-state storage device. According to examples of the presently disclosed subject matter, the extended user data portion of the backup solid-state storage device can be used to back up a certain portion of the logical storage space that was associated with the failed solid-state storage device, for example until the failed solid-state storage device is repaired or until a replacement storage module is provided. Further by way of example, the portion of the logical storage space that was associated with the failed solid-state storage device and is now backed up by the backup solid-state storage device can be mapped to the storage resources associated with the reserved portion of the backup solid-state storage device, while it is used to back up the failed solid-state storage device. Thus, the backup solid-state storage device can service, for example, write, read and erase commands which relate to data that is associated with the portion of the logical storage space that was associated with the failed solid-state storage device and is now backed up by and mapped to the backup solid-state storage device.

In these implementations, the function of the reserved space changes when switching from the normal operating mode to the data protection mode, instead of actually changing the allocation of the physical storage resources to the user data portion of the available physical storage space of the backup solid-state storage device. For convenience the following description relates to the case where physical storage resources of the backup solid-state storage device are allocated to the user data portion of the available physical storage space upon switching the backup solid-state storage device to the data protection mode. However it would be appreciated that the examples of the presently disclosed subject matter are likewise applicable (mutatis mutandis) to the case where the division of the available physical storage space of the backup solid-state storage device is not changed when switching the backup solid-state storage device to the data protection mode, and instead the reserved portion of the backup solid-state storage device is allocated for backing up data from the failed solid-state storage device.

As mentioned above, according to examples of the presently disclosed subject matter, each group of solid-state storage devices that are used to backup one or more other solid-state storage devices can include two, three or more solid-state storage devices. According to an example of the presently disclosed subject matter, the division of the available physical storage space of the members of a group of backup solid-state storage devices can be based on the number of members in the group. Further by way of example, the division of the available physical storage space of the members of a group of backup solid-state storage device solid-state storage devices can be selected so as to enable backing up of the entire user data on one or more than one solid-state storage devices which the group of backup solid-state storage devices is designated or selected to protect, solid-state storage device using at least part of the reserved portion on one or more than one (e.g., two, three . . . all) members of the group of backup solid-state storage devices. Still further by way of example, the division of the available physical storage space of the members of a group of backup solid-state storage devices can be selected so as to enable backing up of the entire logical storage space that was associated with one or with more than one of the solid-state storage devices which the group of backup solid-state storage devices is designated or selected to protect, using at least part of the reserved portion on one or more than one (e.g., two, three . . . all) members of the group of backup solid-state storage devices. Further by way of example, the division of the available physical storage space of any one member of a group of backup solid-state storage devices can be based on the size of its available physical storage space. The division of the available physical storage space of any one member of a group of backup solid-state storage devices can also be based on the size of the available physical storage space of the other members in the group of backup solid-state storage devices.

In the non-limiting example illustrated by FIG. 3, each three of the solid-state storage devices 310, 320, 330 and 340 forms a group of backup solid-state storage devices for the fourth solid-state storage device. During the normal operation mode of the solid-state storage devices 310, 320, 330 and 340, the user data storage capacity of each of the solid-state storage devices 310, 320, 330 and 340 is equal to the user data storage capacity of each of the other solid-state storage devices. In addition, in FIG. 3 the division of the available physical storage space is also equal among the solid-state storage devices 310, 320, 330 and 340 and is proportional to the number of members of solid-state storage devices in the group of backup solid-state storage devices. In this case, there are three members in each group of backup solid-state storage devices and the ratio on each of the solid-state storage devices 310, 320, 330 and 340 among the user data and reserved portions is 3:1. Accordingly, when the solid-state storage device 340 fails, the increased storage capacity on the members of the respective groups of backup solid-state storage devices that includes solid-state storage devices 310, 320 and 330 allows full backup of the entire extent of user data on the failed solid-state storage device 340. According to a further example of the presently disclosed subject matter, when the solid-state storage device 340 fails, the increased storage capacity on the members of the respective groups of backup solid-state storage devices that includes solid-state storage devices 310, 320 and 330 allows full backup of the entire logical storage space that was associated with the failed solid-state storage device 340.

In embodiments of the presently disclosed subject matter one or more stages of the process illustrated in FIG. 2 can be omitted, other stages which would be obvious to a person versed in the art can be added, stages can be executed in a different order and/or one or more groups of stages can be executed simultaneously. FIG. 1 illustrates a general schematic diagram of the system architecture in accordance with an embodiment of the presently disclosed subject matter. Each module in, FIG. 1 can be made up of any appropriate combination of software, hardware and/or firmware that performs the functions as defined and explained herein. The modules in FIG. 1 can be centralized in one location or dispersed over more than one location. In other embodiments of the presently disclosed subject matter, the system can comprise fewer, more, and/or different modules than those shown in FIG.1. In some embodiments, the functionality of the system or of one or more of its elements described herein can be divided differently among the modules shown in FIG. 1, the functionality of the system or of one or more of its elements described herein can be divided into fewer, more and/or different modules than shown in FIG. 1. In some embodiments, the functionality of the system or of one or more of its elements can include additional or less functionality than described herein.

Figure 4:
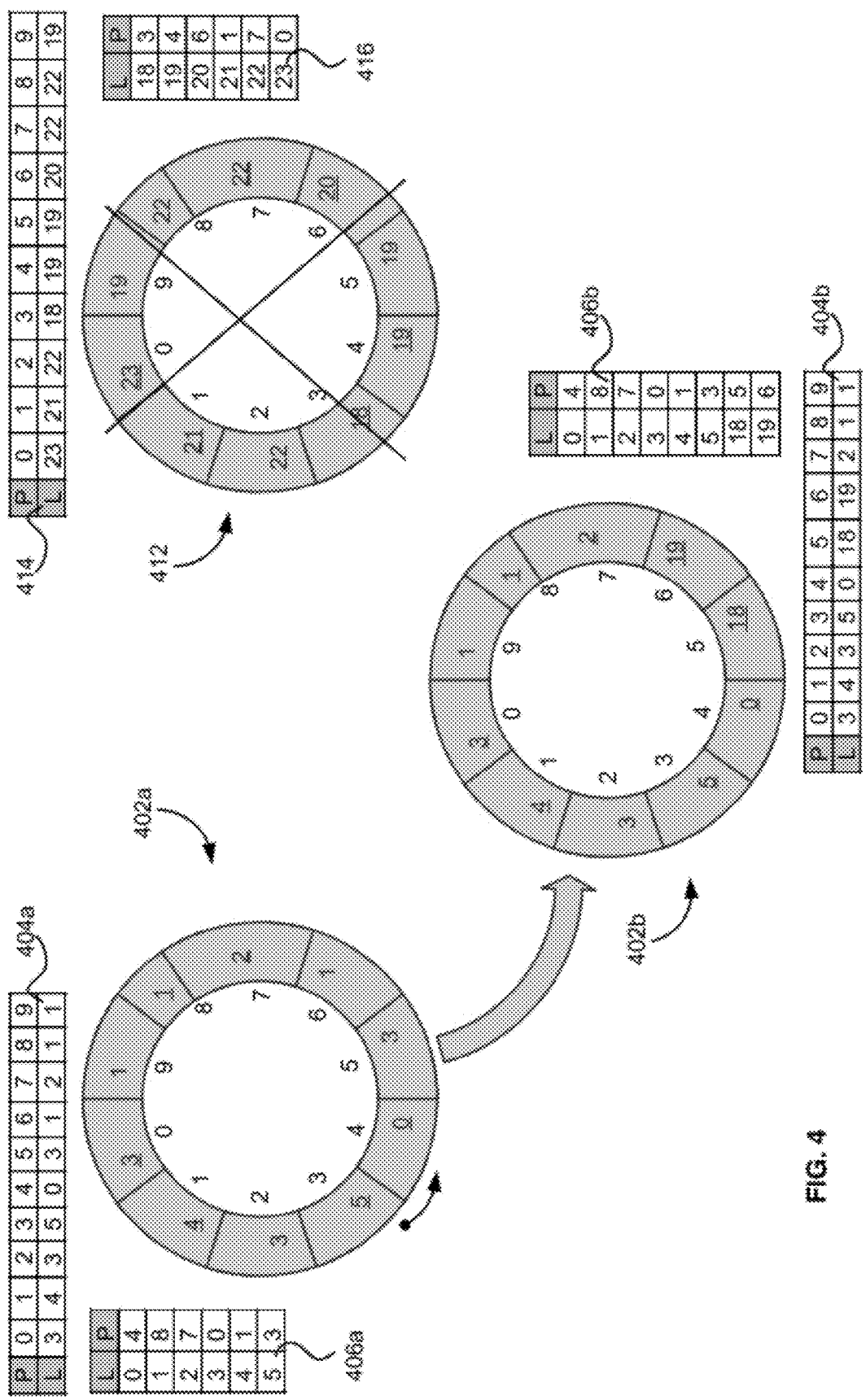
FIG. 4 is a graphical illustration of an application of the currently disclosed subject matter over a flash storage device which implements an LSA file management system internally over its available physical storage space.

It would be appreciated that some solid-state storage devices , and in particular NAND flash storage devices, implement an LSA based file management system internally. Some internal file systems are a modified version of LSA, but are in essence an LSA file system and are considered to be an LSA file system for the purposes of the present disclosure. FIG. 4, to which reference is now made, is a graphical illustration of an application of the currently disclosed subject matter over a flash storage device which implements an LSA file management system internally over its available physical storage space.

In FIG. 4 the available physical storage space 402a of a first solid-state storage device during a normal operating mode is shown. During the normal operation mode of the first solid-state storage device, the available physical storage space 402a of the first solid-state storage device is divided to a user data portion and to a reserved portion by a ratio of 3:2 respectively. As can be seen in FIG. 4, by way of example, while in the first solid-state storage device is in the normal operating mode the equivalent of six logical blocks of user data are stored within first solid-state storage device although the extent of available physical storage space 402a of the first solid-state storage device is equivalent to ten logical blocks. For illustration purposes mapping tables 404a and 406a which map physical addresses to logical blocks and logical blocks to physical addresses, respectively, are shown in FIG. 4, and illustrate the division of the available physical storage space 402a of the first solid-state storage device at a certain instant during the normal operating mode of the first solid-state storage device. As is shown in FIG. 4 by way of example, the available physical storage space 402a of the first solid-state storage device is used for storing the logical blocks marked 0-5. The updated version of each of blocks 0-5 is marked with a matching underlined number, and the physical address of the updated version of each one of logical blocks 0-5 is also apparent from the mapping table 406a. The non-underlined blocks indicate invalid data. As would be further apparent from FIG. 4, the reserved portion of the first solid-state storage device is associated with blocks which hold invalid data. In this regard it would be appreciated that at a given instant, the reserved portion of a solid-state storage device according to examples of the presently disclosed subject matter can be associated with invalid blocks and/or with erased blocks Also shown in FIG. 4 is the available physical storage space 412 of a second solid-state storage device. By way of example, the second solid-state storage device is the solid-state storage device which the first solid-state storage device is designated to protect. In the example shown in FIG. 4 the second solid-state storage device can be protected by a group of backup solid-state storage devices which the first solid-state storage device is a member of. For simplicity of illustration reasons, the other members of the group of backup solid-state storage devices that are designated or selected for protecting the second solid-state storage device are not shown.

The second solid-state storage device is shown at an instant when the second solid-state storage device failed, or when it is about to fail, and by way of example, at this instant the switch of the first solid-state storage device to the data protection mode is triggered. The available physical storage space 412 of the second solid-state storage device is shown as it was during a normal operating mode of the second solid-state storage device, for example immediately before the failure of the second solid-state storage device. As is further shown in FIG. 4, by way of example, during the normal operation mode of the second solid-state storage device, the available physical storage space 412 of the second solid-state storage device is divided in a similar manner to the division of the available physical storage space 402*a* of the first solid-state storage device during the first solid-state storage device's normal operating mode. Thus, while in the second solid-state storage device is in the normal operating mode, the equivalent of six logical blocks of user data are stored within the second solid-state storage device although the extent of available physical storage space 412 of the second solid-state storage device is equivalent to ten logical blocks. For illustration purposes, mapping tables 414 and 416 which map physical addresses to logical blocks and logical blocks to physical addresses, respectively, are shown in FIG. 4, and illustrate the division of the available physical storage space 412 of the second solid-state storage device at a certain instant during the normal operating mode of the second solid-state storage device. As is shown in FIG. 4 by way of example, the available physical storage space 412 of the second solid-state storage device is used for storing the logical blocks marked 18-23. The updated version of each of blocks 18-23 is marked with a matching underlined number, and the physical address of the updated version of each one of logical blocks 18-23 is also apparent from the mapping table 416.

According to an example of the presently disclosed subject matter, in case an indication is received at the first solid-state storage device that the second solid-state storage device has failed or is about to fail, the first solid-state storage device can be configured to switch to a data protection mode. Upon switching to the data protection mode, the first solid-state storage device can be configured to allocate part of the reserved portion of its available physical storage space to the user data portion, giving rise to an extended user data portion on the first solid-state storage device, and the first solid-state storage device can be configured to use the added user data capacity for backing up data that is or that was stored on the second solid-state storage device using the added user data capacity of the first solid-state storage device.

According to an example of the currently disclosed subject matter, the storage system controller can be responsible for one or more of following: detecting the failure of a solid-state storage device that is protected by one or more other backup solid-state storage devices, notifying one or more backup solid-state storage devices that another solid-state storage device which it is/they are designated to protect has failed (or is about to fail), switching one or more backup solid-state storage devices to the data protection mode, instructing one or more backup solid-state storage devices to switch to the data protection mode, causing one or more backup solid-state storage devices to reconfigure its/their available physical storage space as necessary, and managing the backing up of data that is or was stored on the failed solid-state storage device to one or more of the other backup solid-state storage devices that were designated or that were selected for protecting the failed solid-state storage device. As was mentioned above, the backup solid-state storage devices can be configured to carry out one or more of these operations themselves, for example, in case the controller is implemented as a distributed component on the solid-state storage devices themselves, in a manner known per-se.

In the example of the currently disclosed subject matter shown in FIG. 4, in response to switching to the data protection mode as a result of an indication that the second solid-state storage device has failed, the first solid-state storage device can be configured to allocate part of the reserved portion of its available physical storage space to the user data portion in an extent that is equivalent to two logical blocks. As mentioned above, according to an example of the currently disclosed subject matter, upon switching the data protection mode, the members of the group of backup solid-state storage devices can allocate some of their reserved portion or the entire reserved portion to the user data portion.

In FIG. 4, the allocation of the reserved portion of the first solid-state storage device's available physical storage space to the user data portion is in an extent that is equivalent to two logical blocks, as is illustrated by the state of the available physical storage space 402*b* during the data protection mode of the first solid-state storage device. For illustration purposes, updated allocation tables 404*b* and 406*b* which map physical address to logical blocks and logical blocks to physical addresses, respectively, are shown in FIG. 4, and illustrate the modified division of the available physical storage space 402*b* of the first solid-state storage device at a certain instant during the data protection mode of the first solid-state storage device. As is shown in FIG. 4 by way of example, after switching to the data protection mode, the extended user data portion of the available physical storage space 402*b* of the first solid-state storage device is used for storing the logical blocks marked 0-5 and also blocks 18 and 19 which were mapped to the failed solid-state storage device (in this case the second solid-state storage device) before being mapped to appropriate designated or selected backup solid-state storage device, which in this case is the first solid-state storage device. The updated version of each of blocks 0-5, 18 and 19 is marked with a matching underlined number, and the physical address of the updated version of each one of logical blocks 0-5, 18 and 19 is also apparent from the mapping table 406*a*.

According to an example of the disclosed subject matter, a backup solid-state storage device, which switched (or was switched) to a data protection mode and allocated at least part of a reserved portion of its available physical storage space to a user data portion of its available physical storage space, can be configured to revert to the configuration of its available physical storage space prior to the failure of the protected solid-state storage device, and can be configured to restore the division of the available physical storage space to its state previous to the switch to the data protection mode. According to an example, once the storage resources provided by the failed solid-state storage device are replaced, the solid-state storage devices that were used to back up the failed solid-state storage device receive a notification in this regard and the data associated with the failed solid-state storage device which was backed up within the members of the group of backup solid-state storage devices can be copied to the replacement solid-state storage device. According to an example of the disclosed subject matter, once the data from the failed solid-state storage device which was backed up within the members of the group is copied to the replacement solid-state storage device, the physical addresses that were used to back up the data within a member of the solid-state storage device group are trimmed (using a TRIM command). According to an example of the currently disclosed subject matter, the configuration of the available physical storage space back to its state prior to switching to the data protection mode can be carried out in a similar manner to the configuration process of the available physical storage space described above. It would be appreciated that the use, according to an example of the currently disclosed subject matter, of the TRIM command can facilitate straightforward and quick restoration of the configuration of the available physical storage space back to its state prior to switching to the data protection mode.

According to a further example of the presently disclosed subject matter, once the storage resources provided by the failed solid-state storage device are replaced, the solid-state storage devices that were used to backup the failed solid-state storage device receive a notification in this regard and the logical addresses that were originally mapped to the failed solid-state storage device, and as a result of the failure were mapped to the backup solid-state storage device(s), can be mapped to the replacement solid-state storage device (which can be the failed solid-state storage device after being repaired or a replacement solid-state storage device).

It would be appreciated that the number of the solid-state storage devices in the backup group is not limited to the number shown in any of the accompanying drawings, and that a group of backup solid-state storage devices according to examples of the currently disclosed subject matter can consist of any number of solid-state storage devices from one and above (including two, three, four, etc.). It would be also appreciated that the process of allocating storage resources in a given solid-state storage device, including the process of modifying an existing allocation is well known to those versed in the art, and specific aspects thereof were discussed above in detail.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention. method of managing a solid-state storage device, comprising: during a normal operating mode of a first solid-state storage device: reserving a portion of an available physical storage space of the first solid-state storage device, giving rise to a reserved portion and a user data portion; setting a user data capacity of the first solid-state storage device according to a size of the user data portion; using substantially the entire available physical storage space for storing user data within the first solid-state storage device; and upon receiving an indication that a second solid-state storage device is failing, switching the first solid-state storage device to a data protection mode and allocating at least part of the reserved portion to the user data portion, giving rise to an extended user data portion having added user data capacity, and using the added user data capacity for backing up data that is or that was stored on the second solid-state storage device.

Or in another aspect, the machine-readable memory tangibly embodying a program of instructions executable by the machine including: during a normal operating mode of a first solid-state storage device: reserving a portion of an available physical storage space of the first solid-state storage device, giving rise to a reserved portion and a user data portion; setting a user data capacity of the first solid-state storage device according to a size of the user data portion; using the entire available physical storage space for storing user data within the first solid-state storage device; and upon receiving an indication that a second solid-state storage device is failing, switching the first solid-state storage device to a data protection mode and copying at least part of the data that is or that was stored on the second solid-state storage device to storage resources on the first solid-state storage device that are associated with the reserved portion and mapping logical blocks associated with the data that is or was stored on the second solid-state storage device and was written on the first solid-state storage device to the storage resources on the first solid-state storage device that are associated with the reserved portion.

It would be appreciated that a solid-state storage device (including a flash storage device) can include various other components such as a buffer, an error correction module etc., which are not explicitly described herein but would be apparent to a person with ordinary skill in the art.

The invention claimed is:

1. A method of managing a solid-state storage device, comprising:
during a normal operating mode of a first solid-state storage device:
reserving a portion of an available physical storage space of the first solid-state storage device, giving rise to a reserved portion and a user data portion;
setting a user data capacity of the first solid-state storage device according to a size of the user data portion;
using substantially the entire available physical storage space for storing user data within the first solid-state storage device; and
upon receiving at the first solid-state storage device an instruction to switch to a data protection mode, switching the first solid-state storage device to the data protection mode and allocating at least part of the reserved portion to the user data portion, giving rise to an extended user data portion having added user data capacity, and using the added user data capacity for backing up data that is or was stored on a second solid-state storage device.

2. The method according to claim 1, wherein during the normal operation mode of the first solid-state storage device, the extent of user data that can be stored in the first solid-state storage device storage unit is based substantially on a size of the respective user data portion.

3. The method according to claim 1, further comprising, during a normal operation mode, defining a logical storage space of the first solid-state storage device substantially according to a size of the respective user data portion.

4. The method according to claim 3, further comprising, during the normal operation mode, using substantially the entire available physical storage space for servicing I/Os related to the logical storage space of the first solid-state storage device.

5. The method according to claim 3, further comprising, upon switching to the data protection mode, adding to the logical storage space of the first solid-state storage device, logical blocks corresponding to the data that was stored on the second solid-state storage device and was backed up on the first solid-state storage device.

6. The method according to claim 1, wherein upon switching to the data protection mode, copying data from the second solid-state storage device to the first solid-state storage device and using the added user data capacity for backing up the data that was copied from the second solid-state storage device.

7. The method according to claim 1, wherein the data on the second solid-state storage device is protected by redundant data on one or more other solid-state storage devices, and upon receiving an indication that the second solid-state storage device is failing and switching the first solid-state storage device to the data protection mode, copying at least part of the backup data corresponding to data on the second solid-state storage device from the one or more other solid-state storage devices to the first solid-state storage device and using the added user data capacity on the first solid-state storage device for storing the backup that corresponds to the data that was stored on the second solid-state storage device.

8. The method according to claim 7, wherein the one or more other solid-state storage devices that backup the data on the second solid-state storage device are part of a RAID group or part of a mirror pair with the second solid-state storage device.

9. The method according to claim 1, wherein upon receiving an indication that the second solid-state storage device is restored or is replaced and after the data associated with the logical blocks that correspond to the data that was stored the second solid-state storage device and was backed up on the first solid-state storage device is written on the second solid-state storage device or on a replacement solid-state storage device, reconfiguring the available physical storage space of the first solid-state storage device to extend the reserved portion at the expense of the size of the user data portion.

10. The method according to claim 9, wherein reconfiguring includes erasing the physical storage resources on the first solid-state storage device that were allocated to logical blocks that correspond to the data that was stored on the second solid-state storage device.

11. The method according to claim 9, wherein erasing includes applying a TRIM command to the physical storage resources on the first solid-state storage device that were allocated to logical blocks that correspond to the data that was stored on the second solid-state storage device.

12. The method according to claim 1, further comprising implementing a log structured file system over substantially the entire available physical storage space.

13. The method according to claim 1, wherein the first solid-state storage device is a NAND flash device.

14. The method according to claim 1, wherein the second solid-state storage device and one or more other solid-state storage devices constituted a RAID group, and wherein following the copying of data corresponding to data on the second solid-state storage device to the first solid-state storage device; and adding the storage resources on the first solid-state storage device that are used for storing the data corresponding to data that was stored on the second solid-state storage device to the RAID group.

15. The method according to claim 14, wherein upon receiving an indication that the second solid-state storage device is failing switching a first plurality of solid-state storage devices to the data protection mode, copying at least part of the backup data corresponding to data that was stored on the second solid-state storage device to each one of the solid-state storage devices from the first plurality of solid-state storage devices; and adding the storage resources on each one of the solid-state storage devices from the first plurality of solid-state storage devices that are used for storing the data corresponding to data that was stored on the second solid-state storage device to the RAID group instead of the second solid-state storage device.

16. A method of managing a solid-state storage device, comprising:
during a normal operating mode of a first solid-state storage device:
reserving a portion of an available physical storage space of the first solid-state storage device, giving rise to a reserved portion and a user data portion;
setting a user data capacity of the first solid-state storage device according to a size of the user data portion;
using the entire available physical storage space for storing user data within the first solid-state storage device; and
upon receiving an indication that a second solid-state storage device is failing, switching the first solid-state storage device to a data protection mode and backing up at least part of the data that is or was stored on the second solid-state storage device on storage resources of the first solid-state storage device that are associated with the reserved portion, and mapping logical blocks that were associated with the data that was stored on the second solid-state storage device and was copied to the first solid-state storage device to the storage resources on the first solid-state storage device that are used for storing the backup data.

17. The method according to claim 16, wherein during the normal operation mode of the first solid-state storage device, the extent of user data that can be stored in the first solid-state storage device storage unit is based on the size of the respective user data portion.

18. The method according to claim 16, further comprising, during a normal operation mode, defining a logical storage space of the first solid-state storage device unit according to the size of the respective user data portion.

19. The method according to claim 18, further comprising, during the normal operation mode, using the entire available physical storage space for servicing I/Os related to the logical storage space of the first solid-state storage device.

20. The method according to claim 18, further comprising, upon switching to the data protection mode, adding to the logical storage space of the first solid-state storage device logical blocks that correspond to the data that was stored on the second solid-state storage device and that is being backed up on the first solid-state storage device.

21. The method according to claim 20, wherein upon receiving an indication that the second solid-state storage device is restored or is replaced and after the data associated with the logical blocks that correspond to the data that was stored on the second solid-state storage device and was backed up on the first solid-state storage device is written on the second solid-state storage device or on a replacement solid-state storage device, switching the first solid-state storage device to the normal operating mode, including reverting the logical storage space of the first solid-state storage device to its configuration during the normal operating mode.

22. The method according to claim 21, wherein switching the first solid-state storage device to the normal operating mode includes erasing the reserved portion of the available physical storage space of the first solid-state storage device and using the entire available physical storage space of the first solid-state storage device for servicing I/Os related to the logical storage space of the first solid-state storage device.

23. The method according to claim 22, wherein erasing includes applying a TRIM command to the physical storage resources on the first solid-state storage device that are associated with the reserved portion.

24. The method according to claim 18, wherein upon switching to the data protection mode, copying data from the second solid-state storage device to the first solid-state storage device and adding to the logical storage space of the first solid-state storage device logical blocks that correspond to the data that was stored on the second solid-state storage device and is being backed up on the first solid-state storage device.

25. The method according to claim 18, wherein at least part of the data on the second solid-state storage device is protected by redundant data on one or more other solid-state storage devices, and upon receiving an indication that the second solid-state storage device is failing and switching the first solid-state storage device to the data protection mode, writing on the first solid-state storage device backup data which corresponds to at least part of the reserved portion on the one or more other solid-state storage devices, and adding to the logical storage space of the first solid-state storage device logical blocks that correspond to the data that was stored on the second solid-state storage device and is being backed up on the first solid-state storage device.

26. The method according to claim 25, wherein the one or more other solid-state storage devices that protect at least part of the data on the second solid-state storage device are part of a RAID group or part of mirror pair with the second solid-state storage device.

27. A solid-state storage device, comprising:
a solid-state storage device controller adapted to control the operation of a first solid-state storage device;
a solid-state storage device management module adapted to over-provision a physical storage space of the first solid-state storage device, giving rise to an over-provisioned space and an available physical storage space;
a storage space configurator operable for causing the solid-state storage device controller to reserve a portion of the available physical storage space of the first solid-state storage device during a normal operating mode of the first solid-state storage device, giving rise to a reserved portion and a user data portion;
the storage space configurator is further adapted for causing the solid-state storage device controller to set a user data capacity of the first solid-state storage device during the normal operating mode according to a size of the user data portion;
further during the normal operating mode, the storage controller is adapted to use substantially the entire available physical storage space for storing user data on the first solid-state storage device;
the controller is responsive to receiving an indication that a second solid-state storage device is failing or has failed for switching the first solid-state storage device to a data protection mode and for allocating at least part of the reserved portion to the user data portion, giving rise to an extended user data portion having added user data capacity, and using the added user data capacity for backing up data that is or was stored on the second solid-state storage device.

28. The solid-state storage device according to claim 27, wherein during the normal operation mode of the first solid-state storage device, the extent of user data that can be stored in the first solid-state storage device is based substantially on the size of the respective user data portion.

29. The solid-state storage device according to claim 28, wherein the storage controller is adapted to implement a log structured file system over substantially the entire available physical storage space.

30. The solid-state storage device according to claim 27, wherein during the normal operation mode, a logical storage space of the first solid-state storage device unit is defined substantially according to a size of the respective user data portion.

31. The solid-state storage device according to claim 30, wherein during the normal operation mode, the solid-state storage device controller is configured to use substantially the entire available physical storage space for servicing I/Os related to the logical storage space of the first solid-state storage device.

32. The solid-state storage device according to claim 30, further comprising, upon switching to the data protection mode, the storage space configurator is adapted to cause the solid-state storage device controller to add to the logical storage space of the first solid-state storage device logical blocks corresponding to the data that was stored on the second solid-state storage device and was backed up on the first solid-state storage device.

33. The solid-state storage device according to claim 27, wherein upon switching to the data protection mode, the solid-state storage device controller is adapted to copy data from the second solid-state storage device to the first solid-state storage device and to use the added user data capacity for backing up the data that was copied from the second solid-state storage device.

34. The solid-state storage device according to claim 27, wherein the data on the second solid-state storage device is protected by redundant data on one or more other solid-state storage devices, and wherein upon receiving an indication that the second solid-state storage device is failing and switching the first solid-state storage device to the data protection mode, the solid-state storage device controller is adapted to copy at least part of the backup data corresponding to data on the second solid-state storage device from the one or more other solid-state storage devices to the first solid-state storage device, and to use the extended user data capacity on the first solid-state storage device to store the backup data that corresponds to the data that was stored on the second solid-state storage device.

35. The solid-state storage device according to claim 27, wherein upon receiving an indication that the second solid-state storage device is restored or is replaced, the solid-state storage device controller is configured to cause the data associated with the logical blocks that correspond to the data from the second solid-state storage device that was backed up on the first solid-state storage device to be written on the second solid-state storage device or on a replacement solid-state storage device, and the storage space configurator is adapted to reconfigure the available physical storage space of the first solid-state storage device to extend the reserved portion at the expense of the size of the user data portion.

36. The solid-state storage device according to claim 35, wherein the storage controller is adapted to erase the physical storage resources on the first solid-state storage device that were allocated to logical blocks that correspond to the data that was stored on the second solid-state storage device.

37. The solid-state storage device according to claim 36, wherein the storage controller is adapted to apply a TRIM command to the physical storage resources on the first solid-state storage device that were allocated to logical blocks that correspond to the data that was stored on the second solid-state storage device.

38. The solid-state storage device according to claim 27, wherein the data on the second solid-state storage device is protected by redundant data on one or more other solid-state storage devices, and wherein upon receiving an indication that the second solid-state storage device is failing and switching the first solid-state storage device to the data protection mode, the solid-state storage device controller is adapted to write on the first solid-state storage device backup data which corresponds to at least part of the redundant data on the one or more other solid-state storage devices, and to add to the logical storage space of the first solid-state storage device logical blocks that correspond to the data that was stored on the second solid-state storage device and is being backed up on the first solid-state storage device.

39. A solid-state storage device, comprising:
- a solid-state storage device controller adapted to control the operation of a first solid-state storage device;
- a solid-state storage device management module adapted to over-provision a physical storage space of the first solid-state storage device, giving rise to an over-provisioned space and an available physical storage space;
- a storage space configurator operable for causing the solid-state storage device controller to reserve a portion of the available physical storage space of the first solid-state storage device during a normal operating mode of the first solid-state storage device, giving rise to a reserved portion and a user data portion;
- the storage space configurator is further adapted for causing the solid-state storage device controller to set a user data capacity of the first solid-state storage device during the normal operating mode according to a size of the user data portion;
- further during the normal operating mode, the storage controller is adapted to use substantially the entire available physical storage space for storing user data within the first solid-state storage device;
- the controller is responsive to receiving an indication that a second solid-state storage device is failing for switching the first solid-state storage device to a data protection mode, and for backing up at least part of the data that was stored on the second solid-state storage device on storage resources of the first solid-state storage device that are associated with the reserved portion, and for mapping logical blocks that were associated with the data that was stored on the second solid-state storage device and was copied to the first solid-state storage device to the storage resources on the first solid-state storage device that are used for storing the backup data.

40. The solid-state storage device according to claim 39, wherein during the normal operation mode of the first solid-state storage device, the extent of user data that can be stored in the first solid-state storage device is based substantially on the size of the respective user data portion.

41. The solid-state storage device according to claim 39, wherein during the normal operation mode, a logical storage space of the first solid-state storage device is defined substantially according to a size of the respective user data portion.

42. The solid-state storage device according to claim 41, wherein during the normal operation mode, the solid-state storage device controller is configured to use substantially the entire available physical storage space for servicing I/Os related to the logical storage space of the first solid-state storage device.

43. The solid-state storage device according to claim 41, further comprising, upon switching to the data protection mode, the storage space configurator is adapted to cause the solid-state storage device controller to add to the logical storage space of the first solid-state storage device logical blocks that correspond to the data that was stored on the second solid-state storage device and that is being backed up on the first solid-state storage device.

44. The solid-state storage device according to claim 39, wherein upon switching to the data protection mode, the solid-state storage device controller is adapted to copy data from the second solid-state storage device to the first solid-state storage device and to add to the logical storage space of the first solid-state storage device logical blocks that correspond to the data that was stored on the second solid-state storage device and is being backed up on the first solid-state storage device.

45. The solid-state storage device according to claim 39, wherein upon receiving an indication that the second solid-state storage device is restored or is replaced, the solid-state storage device controller is configured to cause the data associated with the logical blocks that correspond to the data that was stored on the second solid-state storage device and was backed up on the first solid-state storage device to be written on the second solid-state storage device or on a replacement solid-state storage device, and the storage space configurator is adapted to switch the first solid-state storage device to the normal operating mode, including reverting the logical storage space of the first solid-state storage device to its configuration during the normal operating mode.

46. The solid-state storage device according to claim 45, wherein the storage controller is adapted to erase the physical storage resources on the first solid-state storage device that were allocated to logical blocks that correspond to the data from the second solid-state storage device.

47. The solid-state storage device according to claim 46, wherein the storage controller is adapted to apply a TRIM command to the physical storage resources on the first solid-state storage device that were allocated to logical blocks that correspond to the data that was stored on the second solid-state storage device.

48. The solid-state storage device according to claim 39, wherein the storage controller is adapted to implement a log structured file system over substantially the entire available physical storage space.

* * * * *